US011895271B1

(12) United States Patent
Skinner et al.

(10) Patent No.: US 11,895,271 B1
(45) Date of Patent: Feb. 6, 2024

(54) REPRESENTATIVE CLIENT DEVICES IN A CONTACT CENTER ENVIRONMENT

(71) Applicant: State Farm Mutual Automobile Insurance Company, Bloomington, IL (US)

(72) Inventors: Chad Skinner, Talladega, AL (US); Amit Gupta, Normal, IL (US); Aaron Kammeyer, Clinton, IL (US)

(73) Assignee: State Farm Mutual Automobile Insurance Company, Bloomington, IL (US)

(*) Notice: Subject to any disclaimer, the term of this patent is extended or adjusted under 35 U.S.C. 154(b) by 152 days.

(21) Appl. No.: 17/390,287

(22) Filed: Jul. 30, 2021

Related U.S. Application Data

(60) Provisional application No. 63/059,629, filed on Jul. 31, 2020.

(51) Int. Cl.
| | | |
|---|---|---|
| *H04M 3/00* | (2006.01) | |
| *H04M 3/51* | (2006.01) | |
| *G06Q 30/016* | (2023.01) | |
| *G06Q 10/10* | (2023.01) | |
| *G06Q 10/0631* | (2023.01) | |
| *G06Q 10/0639* | (2023.01) | |

(Continued)

(52) U.S. Cl.
CPC ............ *H04M 3/5175* (2013.01); *G06F 9/54* (2013.01); *G06N 20/00* (2019.01); *G06Q 10/06398* (2013.01); *G06Q 10/063114* (2013.01); *G06Q 10/063118* (2013.01); *G06Q 10/103* (2013.01); *G06Q 30/016* (2013.01); *H04L 63/04* (2013.01); *G06Q 50/2057* (2013.01)

(58) Field of Classification Search
CPC ........ H04M 3/5175; G06N 20/00; G06F 9/54; G06Q 10/063114; G06Q 10/063118; G06Q 10/06398; G06Q 10/103; G06Q 30/016; H04L 63/04
See application file for complete search history.

(56) References Cited

U.S. PATENT DOCUMENTS

| 6,621,895 B1 | 9/2003 | Giese |
|---|---|---|
| 6,771,766 B1 | 8/2004 | Shafiee et al. |

(Continued)

OTHER PUBLICATIONS

Bozdag, et al., "A Comparision of Push and Pull Techniques for AJAX", 2007 9th IEEE International Workshop on Web Site Evolution, doi: 10.1109/WSE.2007.438.0239, 2007, pp. 15-22.

(Continued)

*Primary Examiner* — Rasha S Al Aubaidi
(74) *Attorney, Agent, or Firm* — Lee & Hayes, P.C.

(57) ABSTRACT

Techniques described herein relate to a client application framework for a contact center environment. A role-specific thick client framework may include a web browser-based, desktop application having multiple processes that can be distributed across the computing infrastructure of the client device. A portion of the framework may include a container application image received from an internal server of the contact center and launched by the client device. The desktop application may collect data associated with use of the container application image and transmit the collected data to a contact center server. The contact center server may process the data, in some instances along with data from additional desktop applications on additional client devices, to implement one or more integrated models across the contact center environment.

20 Claims, 7 Drawing Sheets

(51) Int. Cl.
  *G06F 9/54* (2006.01)
  *H04L 9/40* (2022.01)
  *G06N 20/00* (2019.01)
  *G06Q 50/20* (2012.01)

(56) References Cited

U.S. PATENT DOCUMENTS

| | | |
|---|---|---|
| 7,233,980 B1 | 6/2007 | Holden et al. |
| 7,922,493 B1 | 4/2011 | Gennaro et al. |
| 8,271,618 B1 | 9/2012 | Kridlo |
| 8,396,205 B1 | 3/2013 | Lowry et al. |
| 8,806,024 B1 | 8/2014 | Toba Francis et al. |
| 9,172,806 B2 | 10/2015 | Tuchman et al. |
| 9,521,259 B2 | 12/2016 | Davis et al. |
| 9,843,681 B2 | 12/2017 | Tuchman et al. |
| 9,984,061 B2 | 5/2018 | Isensee et al. |
| 10,275,448 B2 | 4/2019 | Isensee et al. |
| 10,671,337 B2 | 6/2020 | Khalatian et al. |
| 10,693,923 B2 | 6/2020 | Abiezzi |
| 11,423,448 B2 | 8/2022 | Udupa et al. |
| 2003/0033369 A1 | 2/2003 | Bernhard |
| 2003/0078985 A1 | 4/2003 | Holbrook et al. |
| 2004/0024794 A1 | 2/2004 | Jain et al. |
| 2004/0243617 A1 | 12/2004 | Bayyapu |
| 2005/0053018 A1 | 3/2005 | Hoppe-Boeken et al. |
| 2006/0256954 A1 | 11/2006 | Patel et al. |
| 2013/0039483 A1 | 2/2013 | Wolfeld et al. |
| 2013/0086153 A1 | 4/2013 | Vendrow |
| 2013/0176413 A1 | 7/2013 | Lowry et al. |
| 2013/0218922 A1 | 8/2013 | DeLuca et al. |
| 2015/0180845 A1 | 6/2015 | Uomini |
| 2018/0083898 A1 | 3/2018 | Pham |
| 2022/0086279 A1 | 3/2022 | Skinner et al. |
| 2022/0182492 A1 | 6/2022 | Skinner et al. |

OTHER PUBLICATIONS

Office Action for U.S. Appl. No. 17/378,204, dated Sep. 15, 2022, Skinner, "Contact Center Messaging", 13 pages.
Office Action for U.S. Appl. No. 17/378,204, dated May 11, 2022, Skinner, "Contact Center Messaging", 12 pages.

REPRESENTATIVE CLIENT DEVICES IN A CONTACT CENTER ENVIRONMENT

RELATED APPLICATIONS

This patent application claims priority to U.S. Provisional Patent Application No. 63/059,629, filed Jul. 31, 2020, and entitled "Representative Client Devices In A Contact Center Environment," the entirety of which is hereby incorporated by reference.

BACKGROUND

Large organizations often use automated contact centers to handle interactions between employees or representatives of the organization and customers or other parties. Different types of organizations, including businesses, government agencies, and educational institutions may use automated contact centers for sales, customer service, technical and software support, problem resolution, or the like. Automated contact centers may be small or large-scale, depending on the amount of customer traffic and the structure of the organization. Large-scale contact centers, for example, may include representatives in different roles and/or different departments, using client systems that are distributed across different data centers, geographic locations, and/or networks. In some cases, a customer call or other contact (e.g., video or chat session) into the contact center may be answered first by an automated computer system which requests a series of inputs from the customer to determine where the contact is to be routed.

The various hardware, network, and software components of a contact center may collaborate to support interactive communication sessions between customers and organization representatives, each operating independently on the separate computing devices. Different contact center environments may support different combinations of interactive communication session types and/or media types, including voice sessions (e.g., telephony-based), video chat sessions, email communications, social media-based sessions, etc. Some contact centers support targeted routing of contacts to different queues and/or specific representatives based on customer or contact attributes (e.g., media type, geographic location, language, etc.) as well as the customer's responses to automated phone menus, voice response units, conversation bots, and the like. Additionally, some contact centers use automated tools to assist representatives in managing the interaction with the customer during a live contact, such as automated prompting of cross-selling or upselling opportunities, on-the-fly sentiment analysis tools, escalation guidelines, etc.

During an interactive communication session between a representative and a customer, data associated with the contact and/or the contact participants may be stored in or generated by different systems within or external to the contact center. For instance, data relating to the representative may reside in a number of different organization servers (e.g., contact center representative profiles and performance metrics, employee databases, human resources systems, etc.), while data relating to the customer may reside in a number of different organization servers (e.g., customer profiles, accounts, products, claims or support ticket databases, etc.). Additionally, data relating to the contact itself, such as the queuing and routing data, network connection data, and media interactive session details, may be collected and stored by the communication service provider for the interactive session. The various communication services used by contact center environments for providing voice sessions, video sessions, chat sessions, etc., may include internal and/or external services to the contact center. In some instances, external communication services may continuously monitor and collect data during live contacts, and then upon termination of the contact may store the contact data for subsequent processing or analysis.

Thus, in conventional contact centers it may be difficult or impossible to analyze the various data associated with the contact and/or participants to perform advanced contact routing and/or contact management techniques during the course of the live contact between the representative and the customer. To perform such techniques "in-flight" during a live contact, a conventional contact center would need to retrieve and join data from several different relational databases stored within various different clouds and data centers internal and external to the contact center, and then analyze the data on-the-fly during the contact. Delays in retrieving the contact data from the various databases due to network and memory latency issues, as well as the additional computational time to join and analyze the data, make in-flight contact routing or management techniques inefficient at best. Further, as noted above, certain external communication services may only transmit the data relating to a contact after the termination of the contact, and thus such data would be unavailable for any in-flight contact routing or management techniques.

SUMMARY

To address problems and inefficiencies associated with automated contact centers, this disclosure describes various systems and techniques for providing an improved environment and improved data processing techniques. In some examples, a thick client framework may include a desktop application via which client devices associated with representatives access containerized application images for interacting with customers. Aspects of this disclosure include generating and capturing real-time data associated with the customer interactions and using this data to improve functioning of the contact center. In some examples, real-time data generated at a representative device can be transmitted to the contact center to implement real-time quality tracking and/or to assist the representative with real-time information associated with the interaction. Also in examples, data for the representative can be aggregated over time, e.g., over multiple interactions, analyzed, and used to evaluate the representative. Moreover, data generated at the representative device can be aggregated with data from additional representative devices, e.g., at a contact center server, to determine workflows and task-assignment for the contact center environment. For instance, machine-learning models can be used to determine availability of representatives, aptitude of representatives, and/or other information and route contacts, tasks, and/or other work to representatives in improved and efficient manners. Accordingly, systems and techniques described herein can increase representative proficiency, more efficiently resolve customer queries, and/or improve functioning of contact centers.

In an example of the present disclosure, a contact center server includes one or more processors; and one or more non-transitory computer-readable media storing computer-executable instructions. When executed, the instructions cause the one or more processors to perform operations including hosting, at the contact center server, a desktop application and a plurality images associated with containerized applications for interacting with customers; receiving, from a first thick client device running the desktop application and a first containerized application of the containerized applications, first interaction data associated with a first current interactive communication session of the first thick client device with a first customer; receiving, from a second thick client device running the desktop application and a second containerized application of the containerized applications, second interaction data associated with a second current interactive communication session of the second thick client device with a second customer; providing the first interaction data and the second interaction data as input to a trained machine-learned model; and outputting, to the first thick client device or the second thick client device, data based at least in part on an output of the trained machine-learned model.

In another example of the present disclosure, a computing system includes one or more processors; and memory storing processor-executable instructions that, when executed by the one or more processors, cause the one or more processors to perform operations including: receiving a login via a desktop application; based at least in part on receiving the login, requesting a container image from a computer server; receiving the container image from the computer server; executing a containerized process on the client computing device based at least in part on the container image, the containerized process being executed within the desktop application; performing, via the containerized process, an interactive communication session; generating interaction data associated with the interactive communication session; and sending, in-real time and to the computer server, the interaction data.

In yet another example of the present disclosure, a method includes: receiving, at a user interface of a computing device, a login via a desktop application; based at least in part on receiving the login, requesting a container image from a computer server; receiving the container image from the computer server; executing a containerized process on the client computing device based at least in part on the container image, the containerized process being executed within the desktop application; performing, via the containerized process, an interactive communication session; generating interaction data associated with the interactive communication session; and sending, in-real time and to the computer server, the interaction data.

DETAILED DESCRIPTION

Figure 1:
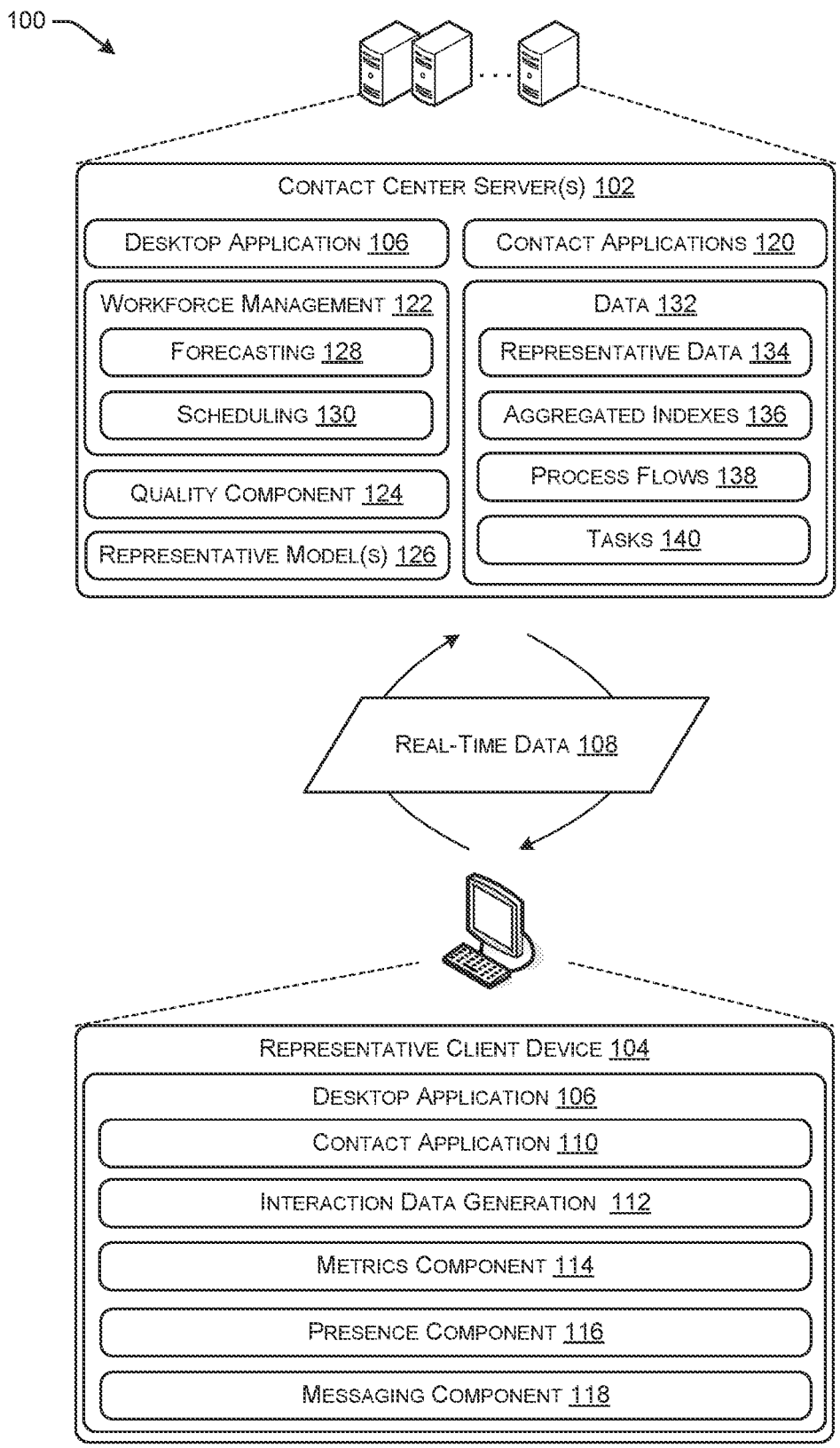
FIG. 1 is a schematic illustration of a computing environment associated with an automated contact center and illustrates an example of communication and data generation for a contact center server and a representative device, in accordance with one or more examples of the present disclosure.

FIG. 1 illustrates an example of data and information generation and transmission in a contact center environment 100 according to aspects of this disclosure. For instance, the contact center environment 100 may schematically represent aspects of a business- or enterprise-wide contact center configured to accept, route, and dispose of customer inquiries. As illustrated in more detail in FIG. 1, the contact center environment 100 includes a contact center server 102 in communication with a representative client device 104. A user, e.g., a human representative of the business or enterprise, may be associated with the representative device 104. The representative client device 104 may be configured to provide one or more user interfaces via which the representative can interact with the representative client device 104. FIG. 1 illustrates only the single representative client device 104, but this is for example only. The contact center environment 100 can include up to and including thousands of instances of the representative client device 104, as well as additional computing devices, as detailed further herein.

The representative client device 104 (and other client devices in the contact center environment 100) is configured to run a desktop application 106. For example, the desktop application 106 may be launched or opened upon a representative logging into the representative client device 104. As detailed further herein, the representative may use the desktop application 106 to perform operations related to the contact environment 100. For instance, the desktop application 106 may facilitate interactive communication sessions, e.g., with customers accessing the contact center environment 100. The desktop application 106 may also facilitate communication with the contact center server 102, e.g., by sending and/or receiving real-time data 108 to/from the contact center server 102. As detailed herein, and for example, the desktop application 106 may facilitate generation and transmission of information related to the interactive communication sessions, generation and transmission of information pertaining to availability of the representative at the representative client device 104, transmission of requests for messages, and/or other information. The desktop application 106 may also facilitate receipt of the real-time data 108, including receipt of information associated with a current interactive communication session, receipt of quality data related to the representative, receipt of tasks and/or work items for the representative to undertake, receipt of messages for display via the desktop application 106, and/or other information. As shown, the desktop application 106 includes a contact application 110, an interaction data generation component 112, a metrics component 114, a presence component 116, and a messaging component 118.

As illustrated in FIG. 1, in at least some examples the representative client device 104 runs an instance of the contact application 110. As detailed further herein, the representative client device 104 can be a thick client device that accesses the contact application 110 and/or downloads an instance of the contact applications 110 to perform an interactive communication session. In some examples, the contact application 110 may be an instance of a containerized application accessible via an image maintained at the contact center server 102. The contact application 110 is run, e.g., by receiving, unpacking, execution, on the representative client device 104 to perform contact-related services. In some instances, the contact application 110 may be a third-party software application that facilitates one or more specific contact interactions. For instance, the contact application 110 may allow a representative using the representative client device 104 to have a text-based conversation with a customer accessing the contact center via a "chat" function, e.g., available on a website or application. In another example, the contact application 110 may allow a representative using the representative client device 104 to have a voice-based conversation with a customer accessing the contact center server 102, e.g., via a phone or other speech-based interface. The contact application 110 can also support other example interactive contact sessions.

Techniques including using containerized application images as the contact application 110 may improve the functioning the contact center environment 100 by providing applications (or sub-processes therein) that are device specific and/or user specific to client devices, such as the representative client device 104. Additional technical advantages of such features within contact center environments may result from more efficient and streamlined software updates and modifications. For instance, when an organization is required to modify or reconfigure a thick client application, if the thick client application is installed on each separate client device then a software update or patch may be transmitted to all client devices associated with the contact center. These decentralized software updates may be uncoordinated, unreliable, and inefficient. In contrast, distributing containerized application images from a repository stored in the contact center server(s) 102 of the contact center may improve performance and distribution of software updates within the contact center. Although the desktop application is shown as providing access to the contact application 110, the desktop application 106 may also provide access to other applications, or instances of applications, that are not directly for the purpose of generating interactive communication sessions. Without limitation, such other applications can include The interaction data generation component 112 is configured to generate interaction data corresponding to interactions at the representative client device 104. For instance, the interaction data may be a video recording, an audio recording, a transcript or other text-based recording, or other representation of tasks performed by the representative using the representative client device 104. Tasks performed at the representative client device 104 can include interactive contact sessions with customers, e.g., via the contact application 110, and the interaction data can be a record of such sessions. As detailed further herein, the interaction data generation can be generated by the contact application 110 or separately therefrom. Other examples of interaction data can include screen captures, screen recordings, recordings of representative inputs at the representative client device 104 (e.g., keystrokes or touch patterns), chat logs, dialog recordings, or the like. In at least some examples, the interaction data generation component 112 can generate different types of interaction data, e.g., depending on the contact application 110 or the interactivity type supported by the contact application 110. In other examples, however, the interaction data generation component 112 can generate a limited number of outputs, e.g., a single data-type. For instance, the interaction data generation component 112 may output only text data and may perform speech-to-text or similar processing to generate text from other data types.

The metrics component 114 generates metrics data. For instance, the metrics data may include quantifiable data about operations performed at the representative client device. Such data may include time information, a duration of an interactive contact session, a duration between successive interactive contact sessions, a duration to accomplish a task other than an interactive contact session, or the like. The metrics data can also include information about a number of contemporaneous interactive contact sessions, a type of interactive contact sessions (e.g., bill pay, address change, general inquiry, dispute, new sale, customer service request, or the like), or the like. The metrics data can be generated in real-time or near-real-time. As detailed further herein, metrics data may be used, e.g., by the representative client device 104 and/or by the contact center server 102, to determine a score or rating for the representative logged into or otherwise associated with the representative client device 104.

The metrics component 114 may also be configured to display or otherwise present metrics data to a representative associated with the representative client device. Without limitation, the metrics component 114 can facilitate presentation of the data discussed above, as well as other data that may quantify aspects of the representative's performance and/or interactions in the contact center environment 100. Although not illustrated, the metrics component 114 can cause the metrics data to be displayed in the desktop application. As noted above, some of the metrics data may be generated in real-time or near-real-time, and the metrics component 114 may update data displayed in the desktop application 106 in real-time or near-real-time In some examples, the desktop application and/or the metrics component 114 may be configurable by the representative to display different metrics data, e.g., based on the representative's preferences, based on an administrator preference, or the like.

The presence component 116 generates presence data. As used herein, presence data may be any data associated with whether a representative is available, e.g., to start a new interactive client session. For instance, presence data can be data indicating that the representative is logged into the representative client device, information about the contact application 110 running via the desktop application, information about additional application(s) running via the desktop application 106 and/or on the representative client device, information about a number of interactive communication sessions active on the contact application 110, or the like. Moreover, the presence data may be video, audio, or other data indicating that the representative is interacting with the representative client device 104. In additional examples, the presence data may be information about computing resources associated with the representative client device 104. For instance, the representative client device 104 may not support certain contact sessions, e.g., because it lacks sufficient processing, hardware, software, or the like. The presence data can also include information about the representative associated with the representative client desktop, e.g., skills, training, certifications, authorizations, or the like, associated with the representative.

The presence component 116 may generate presence information based on sensed, detected, or otherwise automatically-obtained data. In other examples, the presence component 116 can also facilitate generation of a user interface via which a representative associated with the representative client device 104 can input data relative to the representative's availability. For instance, the representative can indicate they are offline, on break, ending their shift, or otherwise unavailable via interaction with such a user interface. The user interface may also allow the user to indicate preferences regarding types of tasks, sessions, or the like, for which they are qualified, in which they are particularly interested, or the like.

In some examples, the presence component 116 may process the presence data, e.g., to determine a presence status associated with the representative. For example, the presence component 116 can make a binary determination, e.g., whether the representative is available or unavailable. In other examples, the presence component 116 may determine a likelihood, e.g., a probability, that the representative is available. The presence component 116 may include a model, e.g., a machine-learned model, that outputs the availability/presence determination. The machine-learned model may be trained on instances of data generated by the representative client device 104. An example machine-learned model may be trained on prior work history of the representative, including but not limited to the interaction data, the metrics data, and the presence data discussed above. Without limitation, the machine-learned model may be a predictive model that determines whether the representative is available or unavailable, and in some instances, the types of tasks that the representative may be available to undertake and/or when the representative may be next available.

The messaging component 118 includes functionality for receiving messages via the desktop application 106. For example, the messaging component 118 may receive messages broadcast by the contact center server 102. Unlike conventional contact center applications that require separating messaging functionality, e.g., via a separate messaging application, the desktop application 106 includes integrated messaging functionality via the messaging component 118. Accordingly, important information may be received automatically at the representative client device 104, and in some instances may be displayed or otherwise provided to the user without any action by the representative. In this manner, important information is displayed automatically, e.g., whenever a new message is broadcast. In at least some instances, the messaging component 118 can query the contact center server 102 for new messages at a predetermined frequency although in other examples new messages may be pushed to the messaging component 118.

As noted above, the interaction data generated by the interaction data generation component 112, the metrics data generated by the metrics component 114, the presence data generated by the presence component 116, and/or any other data generated by or otherwise received at the desktop application 106 running on the representative client device 104 may be used by the desktop application 106 to determine information associated with the representative client device 104. In other examples, any or all of this data may be transmitted to the contact center server 102, e.g., as the real-time data 108. As detailed further herein, the contact center server 102 can generate additional information pertaining to the contact center environment 100, using this and other data from the representative client device 104, as well as from other sources, as detailed herein.

In more detail, the contact center server 102 hosts the desktop application 106 and a plurality of contact applications 120. As detailed further herein, a contact center implementing the contact center server 102 may provide a centralized hub or software architecture for many diverse segments of a business or organization. That is, the contact center server 102 may host a number of different applications accessible by administrators, e.g., via administrator device(s) (not illustrated), by representatives, e.g., via the representative client device 104, and/or by customers (also not shown in FIG. 1). The contact center may have an overarching framework, embodied at least in part in the desktop application 106. As discussed above and further herein, aspects of the desktop application 106 may be accessed by the representative client device 104 to access all other applications, including the contact applications 120, of which the contact application 110 is an example. In other examples, the desktop application 106 may be at least partially stored on the representative client device 104 and/or on other computing devices, including cloud-enabled computing devices.

The contact applications 110 are applications accessed and used by the representative client device 104, e.g., as the contact application 110. As detailed further herein, the representative client device 104 can be a thick client device that accesses the contact applications 120 and/or downloads an instance of the contact applications 120 to perform actions associated with the contact center server. In some examples, the contact applications 120 may be containerized applications accessible via images maintained at the contact center server 102. The contact applications 120 are run, e.g., by receiving, unpacking, and/or execution, on the individual representative client device 104 to perform contact-related services. In some instances, the contact applications 120 are third-party software applications that facilitate one or more specific contact interactions. For instance, a first of the contact applications 120 may allow a representative using the representative client device 104 to have a text-based conversation with a customer accessing the contact center via a "chat" function, e.g., available on a web site or application. A second of the contact applications 120 may allow a representative using the representative client device 104 to have a voice-based conversation with a customer accessing the contact center server 102, e.g., via a phone or other speech-based interface. Other examples will be appreciated.

Techniques including using containerized application images as the contact applications 120 may improve the functioning the contact center environment 100 by providing applications (or sub-processes therein) that are device specific and/or user specific to client devices, such as the representative client device 104. Additional technical advantages of such features within contact center environments may result from more efficient and streamlined software updates and modifications. For instance, when an organization is required to modify or reconfigure a thick client application, if the thick client application is installed on each separate client device then a software update or patch may be transmitted to all client devices associated with the contact center. These decentralized software updates may be uncoordinated, unreliable, and inefficient. In contrast, distributing containerized application images from a repository stored in the contact center server(s) 102 of the contact center may improve performance and distribution of software updates within the contact center.

The contact center server 102 may include a number of components in addition to those for hosting the desktop application 106 and/or supporting the contact applications 120. For example, FIG. 1 illustrates the contact center server 102 as including a workforce management system 122, a quality component 124, and one or more representative models 126. As illustrated, the workforce management system 122 includes a forecasting component 128 and a scheduling component 130. Moreover, the contact center server stores or otherwise has access to data 132. The data 132 can include representative data 134, aggregated indexes 136, process flows 138, and tasks 140. Aspects of these and other systems and components of the contact center server 102 are detailed further herein.

The workforce management system 122 includes functionality to manage aspects of the contact center environment 100. In particular, the workforce management system can determine asset allocation within the contact center environment 100 to efficiently handle customer contacts, as well as other tasks. As illustrated, the workflow management component 122 includes the forecasting component 128 and the scheduling component 130. Generally, the forecasting component 128 includes one or more executable models to receive the data 132 and determine how to deploy workers within the contact center environment, including representatives, administrators, or the like. In more detail, the forecasting component can receive the process flows 138, detailed further below, and the tasks 140, also detailed further below, as well as information about available personnel, specific information about that personnel, e.g., using the representative data 134, and/or other data to determine a business-wide strategy for deploying personnel to accomplish the tasks 140, interact with customers via the contact applications 120, and the like. For instance, the forecasting component 128 may further determine a number of representatives needed to complete various of the tasks 140 and/or to engage in contacts with customers. In examples, the forecasting component 128 can be implemented in one or more models, such as predictive machine-trained models. Such models may be trained on historical data including historical data about previously-performed tasks, previous interactive contact sessions, previous contact center contact volumes, external data that may impact contact center volumes, including information about external events like weather-related events, information about the representatives in those historical contexts, or the like.

The scheduling component 130 implements the strategies developed by the forecasting component 128 of the workforce management system 122. For instance, the scheduling component 130 can generate schedules for individual representatives, groups of representatives, and/or other individuals associated with the contact center environment 100 to implement the strategies. Such schedules may be distributed to representatives, e.g., via the desktop application 106 running on the representative client device 104. The schedules may be generated at predetermined periods, e.g., weekly, daily, before each shift, or the like. In other examples, the scheduling component 130 may generate new schedules whenever new forecasts are generated by the forecasting component 128. In at least some examples, the schedule component 130 can generate new schedules in real time, or near-real time, e.g., as situations change in the contact center environment 100. For instance, in the context of a contact center environment 100 associated with an insurance company, if a contact volume suddenly increases because of a catastrophic event in one area, the workforce management system 122 may react immediately to reassign representatives performing other tasks to perform interactive communication sessions with customers, e.g., to handle the increased number of contacts.

The quality component 124 determines quality for the contact center environment 100, including for individual representatives. In more detail, the quality component 124 can receive information from the representative client device, e.g., the interaction data generated by the interaction data generation component 112, the metrics data generated by the metrics component 114, and/or other data, and determine a score or metric for the representative associated with the representative client device 104. For instance, the score or metric may be a qualitative determination associated with the representative. Conventionally, contact centers may determine quality metrics for representatives by manually reviewing one or more transcripts and/or listening to one or more audio recordings for each representative, and determining, e.g., relative to some criteria, the quality of the representative based on this interaction. Such conventional processes are time-consuming, subject to error and/or undue influence, and it is impractical to review a statistically significant number of interactions necessary to achieve a meaningful quality score. Conventional quality metrics may also be based on objective criteria, e.g., a time to dispose of an inquiry or a representative throughput. However, such metrics can be misleading, especially when customer satisfaction is of particular importance. Other conventional quality metrics may take into account customer sentiment, e.g., based on surveys or other customer satisfaction tools. However, customers are often unlikely to provide information via these tools, the information they often provide can be skewed toward extreme satisfaction or extreme dissatisfaction, and/or collection of such data can be subject to a lag.

Unlike these conventional techniques, the quality component 124 can be implemented using a trained model that can provide real-time, or near real-time, qualitative information. For example, the quality component 124 can receive interaction data from the interaction data generation component about in-process interactive communication sessions, e.g., via the contact application 110. By analyzing these interactions in real time, the quality component 124 can generate one or more real-time scores, e.g., qualitative scores, for the call. For example, a first score may be associated with the representative's performance and a second score may be associated with the customer sentiment. For example, the customer's sentiment may be determined from words used, tone, voice cadence, voice volume, or the like. In some examples, quality metrics determined by the quality component 124 can be displayed to the representative client device 104, e.g., via the metrics component 114, in real-time. Accordingly, the representative may have an understanding of how an interactive communication session is progressing, as the session progresses. In some instances, a quality score for an interaction may be based at least in part on the customer sentiment for that interaction. The quality component 124 can also generate an overall score for the representative, e.g., based on a number of (or all) sessions conducted by the representative. In examples, quality metrics associated with the representatives can be stored as the representative data 143. For example, the quality metrics may be used by the workforce management system 122 to determine how to assign tasks, contacts, or the like to those representatives.

The quality component 124 can also be used for other purposes in the contact center environment. For instance, the quality component can score, e.g., determine quality, on an interaction-by-interaction basis. For example, scoring each interaction may facilitate the creation of training materials. Without limitation, the highest scored interactions or interactions having a score or metric that is equal to or greater than a target score or metric may be used to determine and/or update process flows for handling of similar, future interactions. Similarly, the lowest-scored interactions having a score metric that is below the target score or metric can be identified and used to develop retraining guidelines. Moreover, because of the integrated nature of the contact center environment 100, e.g., with each of the representatives running the desktop application 106 that supplies data to the contact center server 102, the quality component 124, as well as other components of the contact center server(s) 102, can be continuously improved.

The representative model(s) 126 can be one or more models used to determine information for transmitting to the representative client device 104. In more detail, the representative model(s) 126 can include machine-trained models for interacting with the representative client device 104 during an interactive communication session facilitated by the contact application 110. In examples, the representative model(s) 126 can receive interaction data generated by the interaction data generation component 112 during an interactive communication session and generate and send to the representative prompts or other instructions, in real-time, for continuing the interaction. Conventionally, representatives may receive a transcript or plan for handling an interactive communication session. However, when the session diverges from the transcript, the representative may be unsure of how best to interact with the customer. The representative model(s) 126 may remedy these shortcomings by adapting in real-time with updated instructions. For instance, the representative model(s) 126 may perform natural language processing, text-based analysis, transcription analytics, and/or other analytics on interaction data associated with in-progress interactive communication sessions to identify issues as they arise during the session. Without limitation, the representative model(s) 126 can determine when a customer has raised a new issue and identify possible responsive actions to be taken by the representative. For instance, the representative model(s) 126 may identify responses and/or response templates for responding to the newly-identified issue. Also in examples, the representative model(s) 126 can suggest interaction techniques based on customer sentiment. Again, because the data is generated and transmitted while the interactive communication session is in-progress, the mood or engagement of the customer can be gauged, and the representative may be directed accordingly, e.g., with techniques for improving and/or maintaining a current level of customer sentiment.

The contact center server(s) 102 can store, have access to, and/or generate the data 132. As detailed herein, the contact center server(s) 102 are in communication with a number of different client devices, including the representative client device 104, administrator client devices, and the like, as well as with third-party devices, services, and/or other computing systems. Accordingly, the contact center server(s) 102 receive and/or have access to a large amount of data, which is generally embodied as the data 132. For example, the data 132 can include representative data, aggregated indexes 136, data associated with the process flows 138, and data associated with the tasks 140.

The representative data 134 can include any data received by or associated with the representative client device 104 and/or other representative client devices in the contact center environment 100. The representative data 134 can include information about an identity or profile of a representative logged into the representative client device 104. Without limitation, such information may include information about the representative's name, qualifications, certifications, experiences, tenure, or the like. The representative data 134 can also include information about the representative client device 104. Without limitation, such information may include information about processing power, connectivity capabilities (e.g., supported communication modalities), peripheral devices available at the device (e.g., headset, mouse, keyboard), or the like. The representative data 134 may further include information generated at the representative client device 104. Without limitation, such data may include interaction data, metrics data, presents data, and the like. Some or all of the representative data 134 may be received from the representative client device 104 as the real-time data 108.

The aggregated indexes 136 may include aggregated information from a plurality of data sources, such as from a plurality of representative client devices, including the representative client device 104. In examples, the aggregated indexes 136 can include information from a plurality of different data sources and may include differently formatted data. As detailed further herein, individual of the contact applications 120 may support a single contact. For example, a first of the contact applications 120 may support text-based interactions with a contact to the contact center environment 100, a second of the contact applications 120 may support voice-based interactions, a third of the contact applications 120 may support chat-type contacts, and so forth. The aggregated indexes 136 may store data from these disparate types of contacts, e.g., to provide a central data source including information about communication sessions regardless of interface type. In other examples, the contact center server(s) 102 can be configured to generate the aggregated indexes 136 as data in a single format. Without limitation, all interaction data received from representative client devices, regardless of the interaction type, may be converted to a text-based call log or transcript in the aggregated indexes 136. In these examples, the contact center servers 102 may implement speech-to-text processing on audio recordings of voice calls prior to storing the interaction data in the aggregated indexes 136.

As will be appreciated, the contact center servers 102 may use the aggregated indexes 136 to perform various of the functions described herein. Without limitation, the quality component 124 of the contact center servers 102 may use the aggregated indexes 136 two determine quality metrics for a single interaction, e.g., by comparing the interaction to interactions in the accident indexes 136. In other examples, the aggregated indexes 136 may be used as an input into one or more of the representative model(s) 126, e.g., to determine inferred meaning for customer interactions via the representative client device 104. More specifically, the aggregated indexes 136 may be used to train models for generating real time responses, prompts, and/or the like. Generally, the aggregated indexes 136 provide a robust data set of interaction data for any or all interactions in the contact center environment 100, regardless of interaction type.

The process flow data 138 includes information about processes or actions undertaken in the contact center environment 100. Without limitation, the process flows 138 can include any business processes undertaken in the contact center environment 100, including interactive communication sessions undertaken by the representative client device 104. The process flows 138 are not limited to interactions customers, however. In some examples, the process flows 138 can include "back office" processes undertaken by individuals associated with the contact center environment 100, which may be individuals other than representatives. In one nonlimiting example in which the contact center environment 100 is associated with an insurance company, the process flows 138 can include processes for identifying and/or engaging perspective insurance customers, for providing information to agents or salespeople, or the like. Without limitation, the process flows 138 can include information associated with processes related to sales, advertising, marketing, human resources, or asset management. In the context of FIG. 1, the process flows 138 can be used by the workforce management system 122 to allocate assets for forecasting and/or scheduling, as described herein.

The data associated with the tasks 140 includes information about tasks to be performed in the contact center environment 100. In some examples, the tasks may be associated with the process flows 138, e.g., individual of the process flows 138 may be made up of one or more tasks. In some instances, the tasks 140 may be associated with interactive communication sessions to be performed at the representative client device 104. For example, the tasks 140 may include or be associated with a queuing component that cues customer contacts into the contact center environment 100. In other examples, the tasks 140 can include manual tasks, computer implemented tasks, or other tasks. Without limitation, the tasks 140 can be used by the workforce management system 122 allocate individuals for testing and/or scheduling purposes, as described herein.

FIG. 1 illustrates the contact center environment 100 is including the contact center server(s) 102 and the representative client device 104. As described, the representative client device 104 is an example of a single device and the contact center environment 100 will normally include many instances of the representative client device 104, each associated with a different representative. The representatives may perform different types of interactive communication sessions, e.g., voice sessions, chat sessions, email sessions, or the like, all supported by the contact center server(s) 102. The representative client device 104, as will all other representative client devices, may be a thick client device running the desktop application 106 as a single-page application that facilitates interactive communication sessions, among other functionality.

Figure 2:
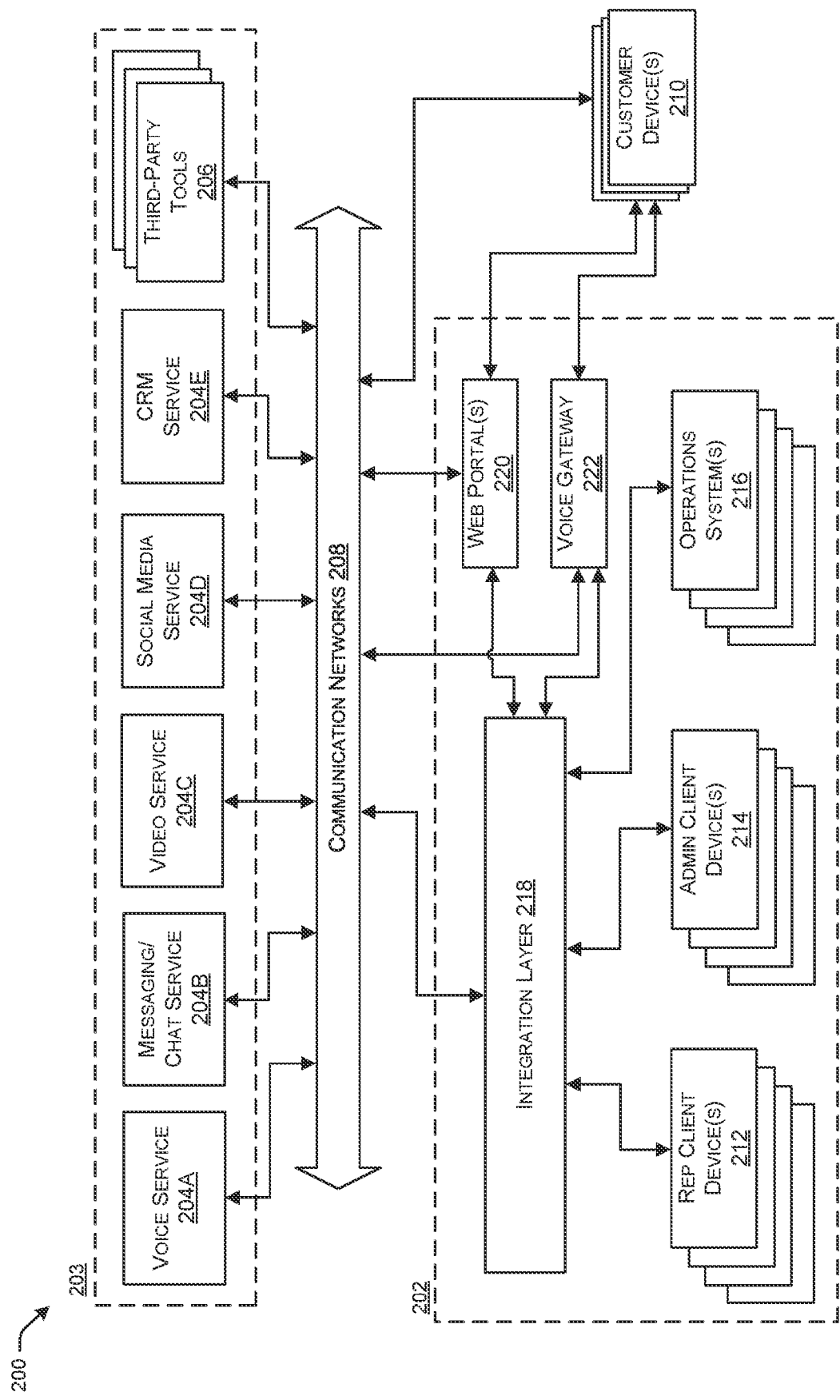
FIG. 2 illustrates a computing environment associated with an automated contact center, including various internal and external computer systems, services, and user devices, in accordance with one or more examples of the present disclosure.

FIG. 2 illustrates an example computing environment associated with a contact center 200. The contact center 200 may be, or may include, the contact center environment 100. The contact center 200 may be a fully automated and/or semi-automated contact center environment. In this example, a first dotted box 202 identifies internal components of the contact center 200, and a second dotted box identifies external services 203 associated with the contact center 200. As used herein, an internal component of a contact center may refer to a component (e.g., computer server or device, network component, software service, application, etc.) that is controlled by the organization operating the contact center. For example, the contact center server(s) 102 and the representative device 104 may be internal components of the contact center 200. In contrast, an external component of the contact center 200 may refer to a component that interacts with at least one internal component of the contact center 200, but which is not controlled by the organization operating the contact center 200. As shown in this example, the external components may include a number of external communication services 204A-204E (collectively "the services 204") and/or tools 206. The services 204 and/or the tools 206 may be provided by third-party service providers. Additional external components may include communication network(s) 208 and one or more customer device(s) 210 that communicate in interactive sessions with representatives (e.g., employees, contract workers, etc.) of the organization.

In some implementations, the internal components of the contact center 200 may reside within a single server, e.g., the contact center server 102, and/or single data center operating at one geographic location. In such cases, some or all of the internal components of the contact center 200 may communicate via a secure private network such as a private LAN or secure corporate network protected by a firewall. In other implementations, the internal components may be distributed across multiple servers and/or multiple data centers that operate at different geographic locations. Internal components that are distributed across data centers may communicate via secure private networks and/or via unsecure public networks (e.g., the Internet) and may use tunneling and encryption technologies. As illustrated, the internal and external components of the contact center may communicate via the communication networks 208, including but not limited to computer networks (e.g., TCP/IP networks, etc.), wireless networks (e.g., Long-Term Evolution (LTE), 5G, a Universal Mobile Telecommunications Service (UMTS), Global System for Mobile communications (GSM) networks, etc.), satellite networks, and the like.

In operation, the contact center 200 may be implemented via the computing environment shown in FIG. 2 to provide interactive communication sessions (or interactive sessions) between customers using the customer device(s) 210, and one or more representatives of the organization using one or more representative client device(s) 212. The customer device(s) 210 and/or the representative client device(s) 212 may be any personal computing devices, such as desktop or laptop computers, mobile devices (e.g., smartphones, tablet computers, etc.), wearable computing devices, or any other device capable of communicating over the communication network(s) 208. The representative client device(s) 212 can include the representative client device 104. In some scenarios, a customer, client, or other individual associated with the organization may use the customer device(s) 210 to contact the organization via a point-of-contact service, such as one or more web portals 220 or a voice gateway 222. In some examples, the contact center 200 may support different services for different communication types, such as the web portal(s) 220 that processes web chat requests received via the web site of the organization, the voice gateway 222 that processes calls received via a telephone network and/or Voice over IP (VOIP) calls. Although two portals/gateways into the contact center 200 are shown in this example, any number of additional customer portals/gateways may be used in other implementations, such as portals or gateway services for voice communications from the customer device(s) 210, video communications, messaging/chat communications, social-media based communications, customer relationship management (CRM) based communications, or the like.

After one of the customer device(s) 210 initiates communication with the contact center 200, or vice versa, the contact center components may assign the customer to a representative and initiate an interactive session between the customer device and one of the representative client device(s) 212, e.g., associated with the assigned representative. Interactive sessions may include voice sessions, video sessions, messaging/web chat sessions, social media sessions, CRM sessions, and/or other sessions. As shown in this example, the contact center 200 may use external services 203 to implement the functionality of providing interactive sessions between customers and representatives. For instance, the contact center 200 in this example uses a voice service 204A from a first external service provider, a messaging/chat service 204B from a second external service provider, a video service 204C from a third external service provider, a social media service 204D from a fourth external service provider, and so on. In various examples, the contact center 200 may use any combination of external or internal communication services.

The external services 203 may include communication services to implement interactive sessions between a customer and a contact center representative, as well as additional services/tools to support additional features and functionalities of the contact center. For instance, the third-party tools 206 may be provided via external service providers and accessed by the internal systems of the contact center 200. Such third-party tools 205 may include, by way of illustration only, transcript generation and/or analysis tools, customer sentiment analysis tools, sales script tools, contact monitoring tools, data analytics tools, workforce management tools, post-interactive session survey tools, etc. As with the communication services 204A-204E, the third-party tools 206 are depicted in this example as external components of the contact center 200, but some or all of these tools may be implemented as internal components, within the contact center 200.

As shown in FIG. 2, a customer may initiate communication via the web portal(s) 220 or the voice gateway 222, after which the contact center components select a communication service 204A-204E based on the communication type used by the customer, and an interactive session is initiated between the customer device 210 and representative client device(s) 212. Although in this example the customer devices 210 are depicted as initiating communication sessions by first contacting an internal component of the contact center (e.g., web portal 220 or voice gateway 222), in other examples the customer devices 210 may initially contact an external communication service 204A-204E. For example, customer service links on the organization's web site may be hosted by and/or redirected to the external services 203. In some cases, the customer communication into the contact center may be answered first by an automated computer system (e.g., implemented within one of the external services 204 or the operations system(s) 216), which requests a series of inputs from the customer. Such automated systems may be implemented as voice response units for voice calls, conversation bots for web chat sessions, etc. The inputs requested from the customer via an automated system may include data identifying the customer (e.g., customer name, account number, ticket number, etc.), the purpose of the contact (e.g., a question type, a product model, etc.), or the language or geographic region of the customer, and the like. Based on the customer's responses, the automated system may determine where to direct the customer for an interactive session, for instance, to a particular data center, department of the organization, a representative having a particular role, criteria, or credentials, or to a particular representative that has had previous contact with the customer.

In some examples, certain internal components of the contact center may be used to select one of the external communication services 204 and initiate a communication session between a customer device 210 and one of the representative client device(s) 212, after which the internal components may extricate themselves from the process and allow the selected external communication service 204 to manage the session. For example, as described below, operations system(s) 216 and internal computer servers and/or components within the integration layer 218 may receive and analyze data associated with incoming requests for interactive sessions from customer devices 210 and assign the interactive sessions to the services 204 and the representative client device(s) 212 to perform the interactive sessions. The operations system(s) 216 and integration layer 218 also may receive and handle requests to transfer contacts from one representative to another, initiate multi-party interactive sessions, and initiate communication sessions between client device(s) 212 and administrator client device(s) 214 or entities within the contact center environment. The various operations system(s) 216 and components within the integration layer 218 also may monitor and analyze the interactive sessions to determine performance metrics for representatives and the contact center as a whole, and to implement policies and instructions based on various models (e.g., contact quality models, efficiency models, workflow projection models, etc.).

The integration layer 218 may provide a common interface between the internal systems and components of the contact center 200 and the external services 203 used by the contact center. For example, the representative client device(s) 212 may communicate with the external communication services 204A-204E and third-party tools 205 via components within the integration layer 218. In some cases, the integration layer 218 provides a common framework for interfacing with the external services 203, so client applications, e.g., the contact application 110 of the contact applications 120, executing on the representative client device(s) 212 may perform similar or identical operations regardless of which external service provider is used. In such examples, the integration layer 218 provides technical advantages and improves the functioning of the contact center components by providing support for plug-and-play among the external communication services 204 and/or the third-party tools 206, without requiring any software change within the client applications executing on the representative client device(s) 212, the administrator client device(s) 214, and/or the customer device(s) 210.

For instance, a voice service 204A provided by a third-party vendor for the contact center 200 may be replaced by a different voice service 204A provided by a different third-party vendor, without requiring any functional change to the client applications, e.g., the contact applications 120 and/or the desktop application 106 executing within the representative client device(s) 212 and/or the administrator client device(s) 214. Similarly, the integration layer 218 may interface with multiple different external services 203 for a single communication type (e.g., multiple different voice services 204A, multiple different messaging/chat services 204B, etc.) simultaneously, so the contact center can use multiple external services 203 for a single communication type at the same time, in a manner that is transparent with respect to the external services 203, the representative client device(s) 212, and/or the administrator client device(s) 214. In such cases, an external communication service 204 may operate similarly or identically regardless of whether the contact center is using another service provider to provide an alternative communication service. The representative client device(s) 212 and/or the administrator client device(s) 214 also may operate similarly or identically regardless of which of the external services 203 (or the internal services denoted by the dotted box 202) is providing an interactive session for the representative client device(s) 212.

The integration layer 218 also may provide an interface between internal components of the contact center (e.g., the representative client device(s) 212, the administrator client device(s) 214, the operations system(s) 216) and third-party tools 205 which operate as services or applications external to the contact center 200. For instance, the internal operations system(s) 216 of the contact center may access third-party tools 205, such as data analytics tools, workforce management tools, etc., via the integration layer 218. The representative client device(s) 212 also may access the third-party tools 205 via the integration layer 218 during an interactive session between a representative and customer. The third-party tools 205 can include customer sentiment tools, post-interactive session survey tools, or the like. As noted above, the integration layer 218 may provide a uniform and common interface for accessing external third-party tools 205, so that various third-party tools 205 may be added, removed, replaced, or upgraded, without requiring any changes to the application software of the contact center internal components.

Additionally, the integration layer 218 may provide an interface between various internal components of the contact center. For example, the representative client device(s) 212 may communicate via the integration layer 218 with other of the representative client device(s) 212, with the administrator client device(s) 214 and/or with other internal servers/systems of the contact center 200. For instance, the integration layer 218 may perform operations associated with sending and receiving interaction data generated by the interaction data generation component 112, within the contact center 200. For instance, and with reference to FIG. 1, the integration layer 218 may support functionality associated with the workforce management system 122, with collecting and storing the representative data 134, with generating the aggregated indexes 136, or the like. The integration layer 218 may also facilitate dissemination of information to the desktop application 106, including message data, e.g., for use with the messaging component 118.

The operations system(s) 216 may be implemented within internal computer servers of the contact center 200, and may provide functionalities for common queuing, monitoring, and analysis and modeling, and policy implementations across the contact center. For instance, the operations system(s) 216 may include the workforce management system 122, the quality component 124 and/or the representative model(s). The representative client device(s) 212 may communicate with various of the operations system(s) 216 via the integration layer 218, allowing the operations system(s) 216 to receive data regarding the interactive sessions executed on the representative client device(s) 212, analyze and/or model the data, and determine operational instructions for the representative client device(s) 212 to implement operational models (e.g., rules and/or policies) across the contact center. Such models may include quality control models, workforce management models, contact center efficiency models, etc.

As illustrated by these examples and the other examples described herein, the integration layer 218 may provide additional technical advantages within contact center environments, including improving the functioning and efficiency of client device(s) 212 and other internal operational system(s) 216. For instance, the integration layer 218 may provide a common queuing framework for client device(s) 212, which is capable of managing the work queue(s) for the representative client device(s) 212 (e.g., live customer contact queues, deferred work item queues, etc.) received from various external and internal contact center services. As noted above, the integration layer 218 also may provide internal operational system(s) 216 with detailed data regarding interactive sessions from diverse representative client device(s) 212 in a consistent and uniform manner, allowing the operational system(s) 216 to improve the performance, contact quality, and workflow across the contact center. Operational system(s) 216 also may include rules engines using heuristics and/or trained machine-learned models to analyze the interactive session data received from different client device(s) 212, and may transmit instructions and/or policies to the representative client device(s) 212 across the contact center to implement uniform and consistent models.

The integration layer 218 is depicted in FIG. 2 as a separate internal component of the contact center. In such examples, the integration layer 218 may include one or more dedicated computer servers and/or software applications or services configured to perform the functionalities of the integration layer 218 described herein. In other examples, the integration layer 218 depicted in FIG. 2 may represent a conceptual layer, in which some or all of the components and functionalities of the integration layer 218 may be implemented within other internal or external devices and systems. For instance, any or all portions of the integration layer 218 may be implemented within the external communication services 204 and/or other external services provided by third-party vendors. Additionally or alternatively, some or all of the integration layer 218 may be implemented within the representative client device(s) 212, administrator client device(s) 214, and/or operations system(s) 216 within the contact center. For example, the representative client device(s) 212 may run a desktop application and/or communication façade(s) to initiate and manage communications with external communication services 204 and other internal components/systems. These applications, façades, and other services or interfaces of the representative client device(s) 212 and/or other operations system(s) 216 of the contact center may implement various portions of the integration layer 218.

Figure 3:
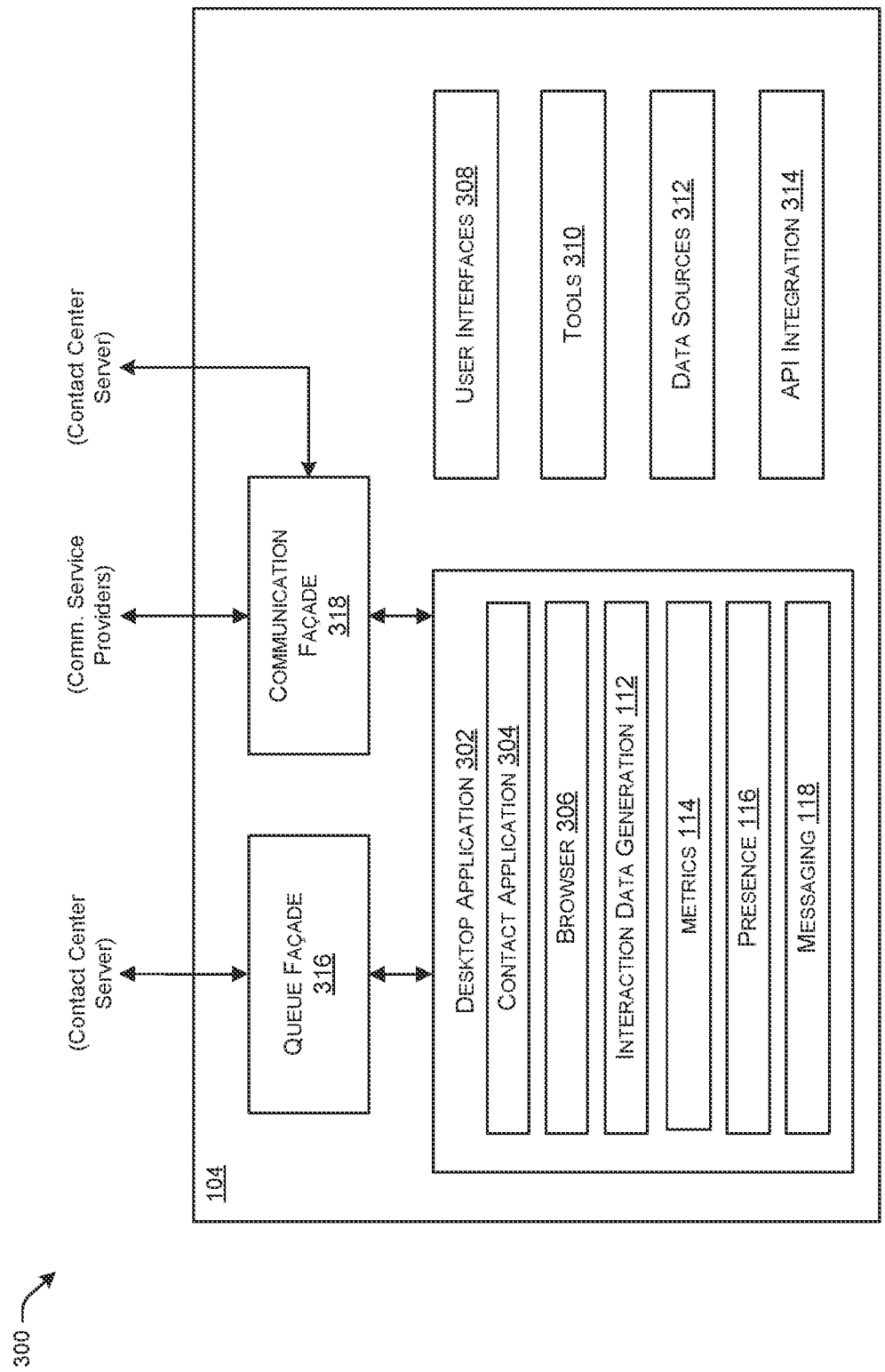
FIG. 3 illustrates an example of a client software framework for generating scheduling and workflows, in accordance with one or more examples of the present disclosure.

FIG. 3 illustrates an example client software framework 300 associated with a representative client device, e.g., the representative client device 104. The components depicted in FIG. 3 may be software components that implement the various functionalities of the representative client device 104 operating within a contact center, e.g., including those functionalities discussed above in connection with FIG. 1. For instance, FIG. 3 illustrates the representative client device 104 as including a desktop application 302, which may be the desktop application 106. The desktop application 302 includes a contact application 304, which may be one of the contact applications 120, a browser 306, the interaction data generation component 112, the metrics component 114, the presence component 116, and the messaging component 118. Using the software framework 300, these and/or other software components running on the representative client device 104 may receive and execute interactive sessions with the customer device(s) 210 via the communication services 204. The desktop application 302 also may interact with various other internal and external components associated with the contact center environment 100 to support common queuing from internal and external sources, and integrated contact center monitoring and modeling, as described below.

The example software framework 300 shown in FIG. 3 may be implemented as a thick client framework. As a result of using a thick client framework like that depicted in this example, a larger portion of the processing tasks to provide the representative functionality in the contact center may be performed on the representative client device 104, while fewer of the processing tasks are performed on the servers of the contact center. In some examples, a thick client framework similar or identical to that shown in FIG. 3 may provide technical advantages in executing the multimedia components and processing bandwidth-intensive communication sessions of the representative client devices 104.

The desktop application 302 may initiate and execute interactive sessions for the contact center, as well as collect data and provide data processing as described herein. As noted above, communication sessions via the contact center allow an organization representative on the representative client device 104 to interact with a customer on an external one of the customer device(s) 210, using any of a number of supported communication types (e.g., voice, messaging/chat, email, video, social media, etc.). To enable communication sessions, the desktop application 302 may connect to one of the communication services 204, receive and transmit user input from the local representative, and output the customer multimedia data received from the communication service.

In some examples, the desktop application 302 may be a single page application. Moreover, the desktop application 302 may be a multi-process (or multi-threaded) application. For instance, each of the components depicted within the desktop application 302 may correspond to a separate computing process. For instance, the application 302 may include functions to perform queue control, to generate interaction data on in-progress customer contacts (e.g., using the interaction data generation component 112), generate data relative to and/or calculate operational metrics (e.g., using the metrics component 114), generate data relative to and/or determine a presence or availability of the representative (e.g., using the presence component 116), and/or support messaging functionality (e.g., using the messaging component 118) for the desktop application 302. In some examples, the desktop application 302 can execute the contact application 304 as one or more containerized processes received from a server as a container image with packaged code along with an IID identifier. The container image may be unpacked and launched on the representative client device 104 to provide functionality associated with the desktop application 304 and/or other functionality described herein, including the functionality of the components illustrated in FIG. 3.

The browser 306 may be a lightweight (or thin) customized browser. For instance, the browser 306 may execute initial logic of the client application 302, including managing a representative login and authentication functions, after which the contact application 304 may be retrieved and downloaded from a server of the contact center, e.g., the contact center server(s) 102. The functionality of the interaction data generation component 112, the metrics component 114, the presence component 116, and the messaging component 118 are generally as described above with reference to FIG. 1.

As shown in this example, the software framework of the client device 104 may include a number of additional software components, including user interfaces 308, tools 310, data sources 312, API integration components 314, a queue façade 316, and a communication façade 318.

In some examples, the desktop application 302 may use the API integration components 314 to access application programming interfaces (APIs) exposed by the operating system of the representative client device 104. Such implementations may provide technical advantages over other contact center client applications. For instance, web browser-based and other thin client applications for contact center representatives may be unable to access the native APIs exposed by the client device. In contrast, the thick client framework examples described herein may provide advantages over web-based thin clients (e.g., uses of web-based techniques and protocols such as JS, CSS, and HTTPS to communicate with external services 204 during interactive sessions), along with advantages of thick clients including access to the file system and native APIs of the representative client device 104. In some examples, the desktop application 302 may record various state data of the representative client device 104 before, during, and/or after an interactive session with a customer (e.g., other open applications and windows, user behaviors and actions performed by the representative on the representative client device 104, etc.). The state data of the representative client device 104 may be analyzed along with the corresponding data associated with the interactive session (e.g., interaction transcript generated by the interaction data generation component 112, customer sentiment determined by or using data generated by the metrics component 114, outcome/resolution of the contact, etc.), to provide more robust data for analyzing interactive sessions and representative performance in the contact center environment. Additionally, the multi-threaded thick client framework may improve the technical and/or digital quality of multimedia communication sessions (e.g., voice and/or video) provided via the contact center. For instance, the desktop application 302 may operate a first computing process (e.g., a thin web browser) to execute the application logic and may launch a second computing process to handle a new interactive multimedia session with a customer. When the representative client device 104 includes multiple processors, the desktop application 302 also may assign the second computing process handling the communication session to a particular process based on the current processor loads, network traffic, and/or quality thresholds for multimedia sessions, in order to assure a higher-quality multimedia session with dedicate hardware, memory, and software resources.

The queue façade 316 and the communication façade 318 are software objects that may provide common interfaces between the desktop application 302 and the external communication services 204. In some examples, the façades 316, 318 may be implemented as services running on the representative client device 104, which expose APIs that may be invoked by an internal application (e.g., the desktop application 302) and/or external applications (e.g., the communication services 204). As noted above, the façades 316, 318 may be part of the integration layer 218 discussed above. Additionally, although façades 316 and 318 may execute on the representative client device 104 as shown in this example, one or both facades 316, 318 may be implemented outside of the representative client device 104 in other examples.

The queue façade 316 may include functionality allowing the desktop application 302 to manage its state in the contact center queues. For instance, based on user inputs received via the desktop application 302 and/or the presence data generated by the presence component 116, the queue façade 316 may determine that the representative user is available to handle a work item. The queue façade 316 also may determine from which external communication service 204 to request a live contact work item and transmit the request. As discussed below, the queue façade 316 also may communicate with internal operations system(s) 216 of the contact center to request and receive non-live contact work items (which may be referred to as backlogged or deferred work), e.g., the tasks 140.

The queue façade 316 may include logic to select the next work item (e.g., a new live customer contact, or a new deferred work item) to be presented to the representative, based on data received from the representative via the desktop application 302 and/or external data sources outside of the representative client device 104. For instance, the queue façade 316 may include some or all of the workforce management system 122 and may have access to the data 132. For example, within the desktop application 302, the representative user may select one or more communication types (e.g., voice, chat, video, social media, etc.), areas of expertise (e.g., interaction categories or topics), and/or additional criteria (e.g., representative role, experience level, credentials or licenses) to define the parameters of the live contacts that the representative user prefers or is qualified to handle. In some cases, the desktop application 302 may automatically select the communication types for live contacts based on the type of the representative client device 104, the I/O components of the representative client device 104, and the current location or context of the devices. As an example, if the representative client device 104 lacks a display screen and a detached keyboard, the desktop application 302 may determine that the representative client device 104 may perform voice sessions but not chat or video sessions. As another example, if the representative client device 104 is a mobile device (e.g., laptop or smartphone) being operated in a public setting and significant background noise is detected via the APIs of the client OS, the desktop application 302 may determine that the representative client device 104 may perform web chat sessions but not voice or video sessions, etc.

Additionally or alternatively, the queue façade 316 may receive additional data from other data sources, such as the external communication services 204, internal operations system(s) 216, and/or queue façades of other client devices. The additional data may include the current state of the various internal queues (e.g., deferred work items) and external queues (e.g., live contacts awaiting assignment) in the contact center, the profiles or characteristics of the other representatives that are currently active in the contact center, and the current sets of rules or policies implemented within the contact center to determine routing decisions, efficiency and quality thresholds, etc. Based on the various data received from the desktop application 302 and/or other data sources, the queue façade 316 may determine which of the communication services 204 to contact to request a new live contact, which of the internal operations system(s) 216 to contact to request a deferred work item, and/or any parameters to be sent with such requests. When the representative user indicates via the user interface of the desktop application 302 that he/she is ready for a new work item (or when the desktop application 302 performs the determination automatically based on monitoring the activity of the representative client device 104 and/or based on presence data as described herein), the queue façade 316 may transmit a request to the selected communication service for a connection to a new live contact and/or may transmit a request to an internal operations system for a new deferred work item.

The communication façade 318 also may provide a common interface between the desktop application 302 and the external communication services 204. In this example, the queue façade 316 may manage the state of the desktop application 302 in various queues of the contact center as described above, while the communication façade 318 includes the capabilities to deliver the media (e.g., text, audio data, video data, image data, etc.) to and from the representative during the interactive session with the customer. In some scenarios, after the representative user begins work with the desktop application 302 (e.g., authenticates and/or logs-in), the desktop application 302 may instruct the queue façade 316 to transmit a device registration to one or more of the external services 204. The device registration may include an IP address associated with the communication façade 318. The external services 204 may transmit media content to the communication façade 318 during subsequent interactive sessions, and the communication façade 318 may relay the media content to the desktop application 302 for presentation to the user.

Figure 4:
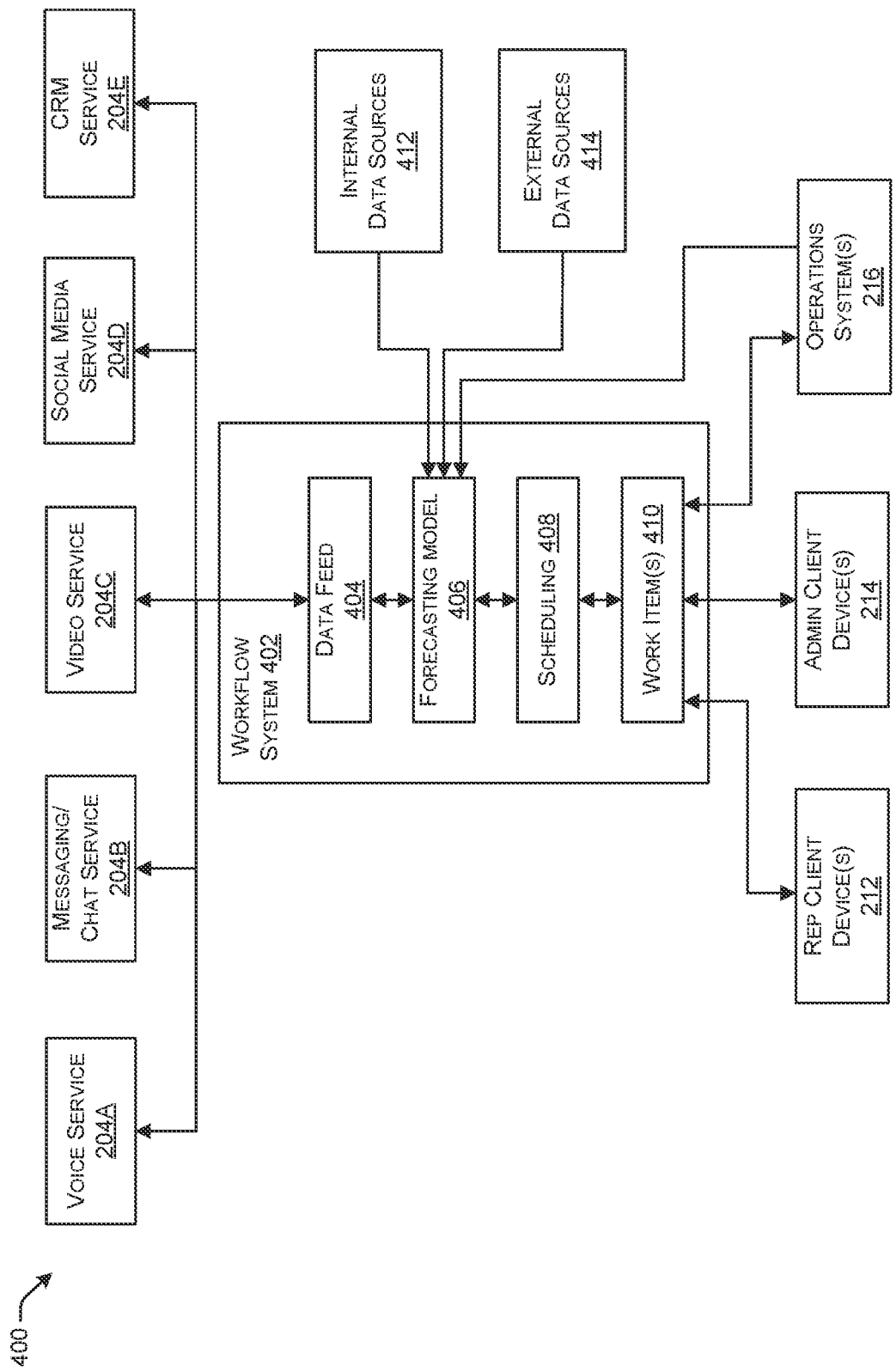
FIG. 4 illustrates an example of a client software framework for a representative client device, in accordance with one or more examples of the present disclosure.

FIG. 4 illustrates a computing architecture 400 including a workflow system 402 with various components for performing operations with a contact center environment, such as the contact center environment 100. For example, the computing architecture 400 may be a portion of a contact center environment, such as the contact center server 102 and/or the contact center 200. In this example, the workflow system 402 includes a data feed component 404, a forecasting model 406, a scheduling component 408, and one or more work items 410. As detailed further below, the various components of the workflow system 402 may receive, store, and use data from various different sources, including data relating to live contacts handled by the contact center 200. A live contact may refer to an ongoing or interactive communication session between one of the customer device(s) 210 and the various components of the contact center 200, including customer-requested sessions that are in-queue and awaiting assignment, on-hold, as well as active interactive communication sessions between the customer device(s) 210 and one of the representative client device(s) 212.

In various examples, the workflow system 402 may be implemented as a single computing device or server, or as a combination of multiple interconnected devices and/or servers, e.g., within the integration layer 218 of the contact center 200 and/or at the contact center server(s) 102. As such, the workflow system 402 and associated software components, e.g., one or more of the data feed component 404, the forecasting model(s) 406, the scheduling component 408, and/or the work item(s) 410 may include and/or may be executed on hardware-based computing devices or servers having hardware/network infrastructures and components such as processor(s), computer-readable memory, network interface(s), etc. Additionally or alternatively, some or all portions of the workflow system 402 and/or its associated components described herein may be implemented within other systems internal or external to the contact center 200, such as within the representative client device(s) 212, the administrator client device(s) 214, and/or within the operations system(s) 216 of the contact center 200.

A contact center 200 may support a number of different communication session types, which may be initiated, managed, and/or supported by the external communication services 204. In various examples, the communication services 204 may be provided by sources external to the contact center 200. In this example, the workflow system 402 may receive information from providers of the communication services 204A-204E to establish network connections and stream media between customer device(s) 210 and the representative client device(s) 104. When the contact center receives a customer request for an interactive session, the request may be assigned to a particular one of the communication services 204 based on the communication media type and/or based on the communication gateway or portal from which the customer accessed the contact center (e.g., voice, video, web chat, social media, etc.). The assignment may also be based on one or more other criteria, including but not limited to a geographic location or region of the customer, current service provider status, current contact center status, or the like. If a qualified representative is immediately available to handle the request, the contact center, using services from the communication services 204, may establish the network connections to initiate and manage the interactive session between the customer device(s)

210 and the representative client device(s) 212 of the available representative. Otherwise, the customer request may be queued during which the customer device(s) 210 may remain connected to the contact center, e.g., a representative is available to handle the contact.

At any time during a live contact with the customer device(s) 210, including when the contact is in-queue, on-hold, or when the contact is connected to one of the representative client device(s) 212, the contact center 200 may generate data relating to the live contact. As shown in this example, the live contact-related data may be transmitted from the communication services 204 to the workflow system 402, e.g., the data feed component 304. For instance, the communication services 204 may output data indicating a change in the status of the live contact, such as when the contact is first received, queued, connected to one of the representative client device(s) 212 or one of the administrative client device(s) 214, placed on hold, disconnected or terminated, etc. Additionally, the communication services 204 may generate and output data based on any user inputs received via the customer device(s) 210 before the customer is connected to a representative, such as the customer's responses to an automated menu or voice response unit (VRU) for voice contacts, or responses to a conversation bot for web chat contacts. The communication services 204 also may generate and output status data relating to the network connection and quality (e.g., network types and access networks, network traffic and performance, available bandwidth, etc.) and media quality (e.g., media resolution, latency issues, buffering events, etc.).

Moreover, and as detailed above, individual of the representative client device(s) 212, including the representative client device 104, may include functionality to generate, in real-time, information about an interactive communication session. Without limitation, the representative client device(s) 212 can include the interaction data generation component 112 that generates and sends, e.g., streams in real-time or near-real time, data about the session.

The data feed component 404 within the workflow system 402 may receive data from the communication services 204 and/or from the representative client device(s) 212 relating to the current live contacts (e.g., queued, on-hold, or during an interactive media session) of the contact center 200. Depending on the size and scale of the contact center 200, the data feed component 404 may receive data associated with hundreds or even thousands of live contacts concurrently, e.g., from the communication services 204 and/or from the representative client device(s) 212, such as via the desktop application. In some examples, the workflow system 402 may subscribe to receive steams of event data from the communication services 204 relating to live contacts for the contact center 200. Such subscriptions may include push notifications transmitted from the communication services 204 to the data feed component 404, where each notification subscription may include events for a single contact, group of contacts, or for all contacts associated with the contact center 100. In some instances, the communication services 204 may output event data to cloud-based data stores or other data repositories. In such cases, the data feed component 404 may subscribe to receive event notifications from the cloud data stores/repositories, or may periodically query the cloud data stores/repositories to retrieve the updated event data for any live contacts of the contact center 200. In still further examples, the data feed component may receive data, e.g., streams of data, from the various representative client device(s) 212. For instance, the data feed component 404 can receive the interaction data generated by the interaction data generation component 112. In still further examples, the data feed component 404 may receive, store, or access any or all of the data 132 discussed above, including the aggregated indexes 136 generated based on the interaction data, as described herein.

The forecasting model 406 may receive information from the data feed component 404 and can determine allocations for tasks and contacts among personnel in the enterprise associated with the contact center environment. In some examples, the forecasting model 406 can employ some functionality of the queue façade 316. For instance, the forecasting model 406 can be associated with routing incoming contacts to the contact center, e.g., to representatives, based on availability of those representatives, capabilities of those representatives, or the like.

In addition to receiving information from the data feed component 404, the forecasting model 406 is also illustrated as receiving information from internal data sources 412 and external data sources 414. For instance, information from the internal data sources 412 and/or the external data sources 414 may also or additionally be used to determine needs within the system. In the context of queue façade 316, the forecasting model 406 may access the representative data 134 as an internal data source 412 to determine whether and which representatives are available, capabilities and training for those representatives, or the like. Similarly, the forecasting model 406 can data from the representative client device(s) 212 as the internal data sources 412. For instance, the forecasting model 406 van receive the interaction data from the interaction data generation component and/or presence data from the presence component 116 as internal data sources 412. The forecasting model 406 may retrieve the tasks 140 from the internal data sources 312 of the organization. Similarly, the forecasting model 406 may access the process flows data 138, e.g., to determine steps or portions to be undertaken. Additionally, the forecasting model 406 may retrieve customer-related data from the external data sources 414, which may include external governmental databases, educational institutions, financial institutions, workplace databases, social media servers, or other third-party data sources. Data from the internal data sources 412 and/or from the external data sources 414 may include customer demographic data (e.g., age, occupation, marital status), geographic data (e.g., the customer's home state, county, or city, and/or the customer's current location), financial/purchase data (e.g., income, recent larges purchases, etc.), or life event data (e.g., recent marriages, divorces, children, etc.). In other examples, the forecasting model can receive environmental data, e.g., from external data sources 414 such as weather- or current-event data sources. In a non-limiting example, the forecasting model 406 may use weather or current-event data to predict a likely contact volume.

Data from the internal data sources 412 and/or the external data sources 414 may be independent of any customer contact with the contact center 200. For instance, the internal data sources 412 can include information about functioning of the computing systems and components of the contact center 200. Information from the internal data sources 312 can also include information about updates to aspects of the contact center, including updates to procedures, policies, equipment, functionality, or the like. As noted above, information from the internal data sources 412 can also include process flows data 138 and/or tasks data 140. The external data sources 414 can include third-party information providers. Without limitation, the forecasting model 406 can receive weather information, newsfeeds, social media information and/or other information that may be relevant to events that could impact operations at the contact center and/or that could impact representatives at the contact center. As also illustrated, the forecasting model 406 can receive information from the operations system(s) 216. The forecasting model 406 can receive any information, from any sources, that may be used to allocate resources at the contact center, as detailed further herein.

As noted above, the forecasting model 406 includes functionality to determine allocate resources to perform actions associated with the contact center 200. Generally, the forecasting model 406 receives the information from the communication services 204, the internal data sources 412, the external data sources 414, the operations system(s) 216, and/or any other sources, and processes this information to determine tasks to be completed, personnel available to complete those tasks. For instance, the forecasting model 406 can include a rules engine executing heuristics-based logic to analyze the received data, and determine tasks and personnel, based on the data. Additionally or alternatively, the forecasting model 406 may include various machine-learned models and algorithms to process the data. Various combinations of machine-learned models and algorithms may be used in different implementations, including but limited to regression algorithms, instance-based algorithms, Bayesian algorithms, decision tree algorithms, clustering algorithms artificial neural network algorithms, and/or deep learning algorithms. The machine-learned models and algorithms within the forecasting model 406 may output a predicted need, e.g., an expected contact volume, a list of tasks to be performed at the contact center, and/or other information about actions to be performed, and information about personnel availability. The forecasting model 406 may also determine a confidence value or metric associated with any such determinations.

The scheduling component 408 includes functionality to receive the actions to be performed and the available personnel to determine one or more schedules or assignments. For example, the scheduling component 408 can include one or more trained models and/or algorithms for assigning to-be-completed tasks to available personnel. In some instances, the forecasting model 406 and the scheduling component 408 can determine schedules at predetermined frequencies. For instance, the scheduling component 408 can determine schedules for individuals, personnel groups, or an entirety of the organization daily, weekly, prior to a new shift starting, or the like. In other instances, the scheduling component 408 can generate new schedules upon events occurring at the contact center. For instance, increased contact volume, e.g., above a threshold volume, can cause the forecasting model 406 and/or the scheduling component 408 to re-allocate personnel, e.g., to increase representative availability for supporting additional communication sessions while re-prioritizing or delaying completion of other tasks. In other examples, and because the data feed can include real-time data, including real-time data generated by the representative device(s) 212, the scheduling and allocating of representatives can be done in real-time or near-real time, leading to improved outcomes relative to conventional scheduling practices. For example, conventional scheduling techniques are largely manual, and inflexible.

In some examples, the work item(s) 410 can include assignments, tasks, work objects, and/or discrete actions to be performed, in accordance with an output from the scheduling component 408. In the example of the workflow system 402 implementing portions of the queue façade 316, the work item(s) 410 can include a next contact for handling by a specific representative client device 212. In other examples, the work item(s) 410 can include any task or tasks associated with the business supported by the contact center. In examples, the work item(s) 410 and/or other information associated with schedules determined by the scheduling component 408 can be presented to the representative client device(s) 212, the administration client devices(s) 214 and/or the operations system(s) 216. For example, the work item(s) can be transmitted to the devices via the desktop application 302, the contact application 304, or otherwise.

Figure 5:
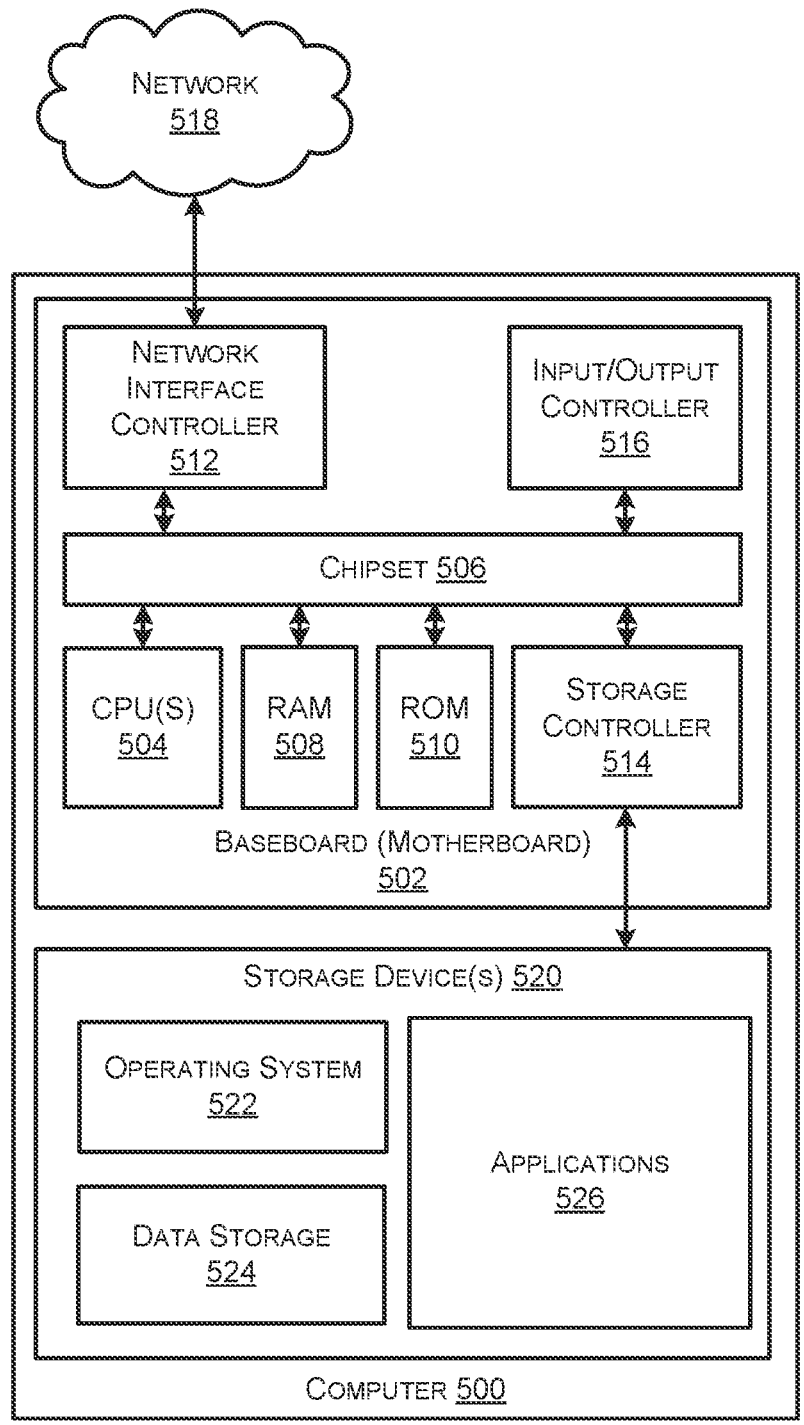
FIG. 5 is an example architecture for a computing device capable of executing program components for implementing various techniques described herein.

FIG. 5 shows an example computer architecture for a computer 500 capable of executing program components for implementing the functionality described herein. The computer architecture shown in FIG. 5 may correspond to the systems and components of a server computer, workstation, desktop computer, laptop, tablet, network appliance, mobile device (e.g., tablet computer, smartphone, etc.), or other computing device, and can execute any of the software components described herein. The computer 500 may, in some examples, correspond to any of the computing systems or devices described above, such as the representative client device 104, administrator client device(s) 214, operational system(s) 216, and/or any other computing devices described herein. It will be appreciated that in various examples described herein, a computer 500 might not include all of the components shown in FIG. 5, can include additional components that are not explicitly shown in FIG. 5, and/or may utilize a different architecture from that shown in FIG. 5.

The computer 500 includes a baseboard 502, or "motherboard," which may be a printed circuit board to which a multitude of components or devices are connected by way of a system bus or other electrical communication paths. In one illustrative configuration, one or more central processing units ("CPUs") 504 operate in conjunction with a chipset 506. The CPUs 504 can be standard programmable processors that perform arithmetic and logical operations necessary for the operation of the computer 500.

The CPUs 504 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 506 provides an interface between the CPUs 504 and the remainder of the components and devices on the baseboard 502. The chipset 506 can provide an interface to a RAM 508, used as the main memory in the computer 500. The chipset 506 can further provide an interface to a computer-readable storage medium such as a ROM 510 or non-volatile RAM ("NVRAM") for storing basic routines that help to startup the computer 500 and to transfer information between the various components and devices. The ROM 510 or NVRAM can also store other software components necessary for the operation of the computer 500 in accordance with the configurations described herein.

The computer 500 can operate in a networked environment using logical connections to remote computing devices and computer systems through a network, such as the network 518, which may be similar or identical to network 208 discussed above. The chipset 506 also may include functionality for providing network connectivity through a Network Interface Controller (NIC) 512, such as a gigabit Ethernet adapter. The NIC 512 is capable of connecting the computer 500 to other computing devices over the network 518. It should be appreciated that multiple NICs 512 can be present in the computer 500, connecting the computer to other types of networks and remote computer systems. In some instances, the NICs 512 may include at least on ingress port and/or at least one egress port.

The computer 500 can also include one or more input/output controllers 516 for receiving and processing input from a number of input devices, such as a keyboard, a mouse, a touchpad, a touch screen, an electronic stylus, or other type of input device. Similarly, an input/output controller 516 can provide output to a display, such as a computer monitor, a flat-panel display, a digital projector, a printer, or other type of output device.

The computer 500 can include one or more storage device(s) 520, which may be connected to and/or integrated within the computer 500, that provide non-volatile storage for the computer 500. The storage device(s) 520 can store an operating system 522, data storage systems 524, and/or applications 526, which are described in more detail herein. The storage device(s) 520 can be connected to the computer 500 through a storage controller 514 connected to the chipset 506. The storage device(s) 520 can consist of one or more physical storage units. The storage controller 514 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 500 can store data on the storage device(s) 520 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device(s) 520 are characterized as primary or secondary storage, and the like.

For example, the computer 500 can store information to the storage device(s) 520 by issuing instructions through the storage controller 514 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 500 can further read information from the storage device(s) 520 by detecting the physical states or characteristics of one or more particular locations within the physical storage units.

In addition to the storage device(s) 520 described above, the computer 500 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 500. In some examples, the various operations performed by a computing system (e.g., client devices 110, internal servers 302, etc.) may be supported by one or more devices similar to computer 500. Stated otherwise, some or all of the operations described herein may be performed by one or more computers 500 operating in a networked (e.g., client-server or cloud-based) arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device(s) 520 can store an operating system 522 utilized to control the operation of the computer 500. In some examples, the operating system 522 comprises a LINUX operating system. In other examples, the operating system 522 comprises a WINDOWS® SERVER operating system from MICROSOFT Corporation of Redmond, Washington. In further examples, the operating system 522 can comprise a UNIX operating system or one of its variants. It should be appreciated that other operating systems can also be utilized. The storage device(s) 520 can store other system or application programs and data utilized by the computer 500.

In various examples, the storage device(s) 520 or other computer-readable storage media is encoded with computer-executable instructions which, when loaded into the computer 500, transform the computer from a general-purpose computing system into a special-purpose computer capable of implementing various techniques described herein. These computer-executable instructions transform the computer 500 by specifying how the CPUs 504 transition between states, as described above. In some examples, the computer 500 may have access to computer-readable storage media storing computer-executable instructions which, when executed by the computer 500, perform the various techniques described herein. The computer 500 can also include computer-readable storage media having instructions stored thereupon for performing any of the other computer-implemented operations described herein.

As illustrated in FIG. 5, the storage device(s) 520 may store one or more data storage systems 524 configured to store data structures and other data objects. Additionally, the software applications 526 stored on the computer 500 may include one or more client applications, services, and/or other software components. For example, for a representative client device(s) 212, application(s) 526 may include the contact application 304, the browser 306, the queue façade 316, the communication facade 318, and/or other software components described in reference to FIG. 3.

Figure 6:
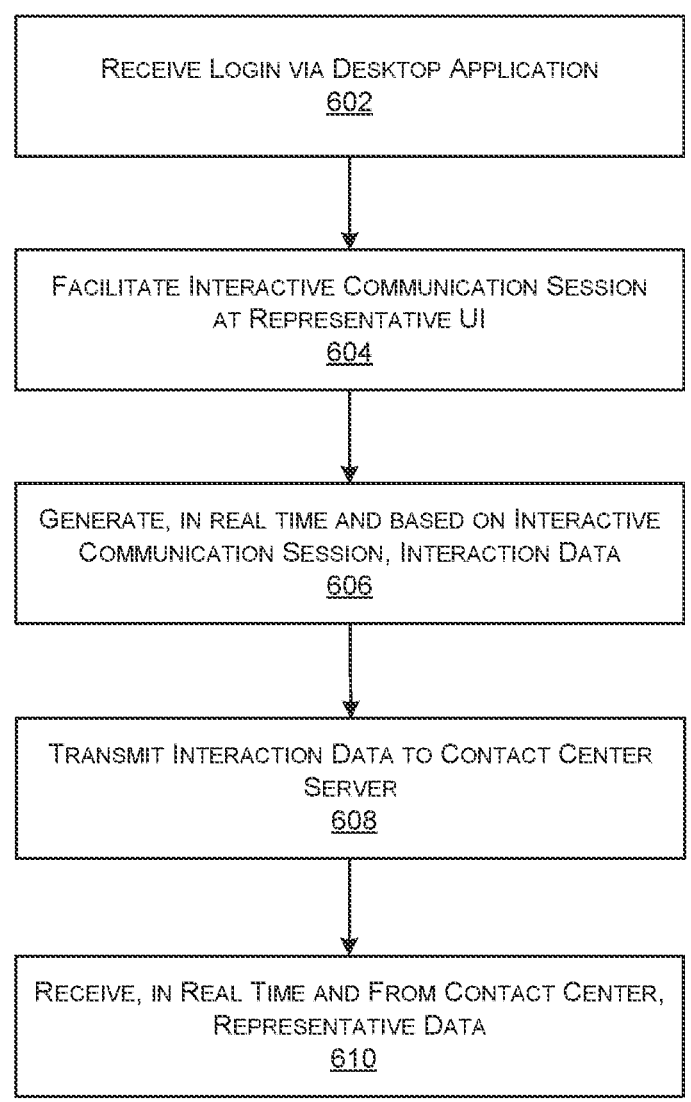
FIG. 6 is a flow diagram illustrating an example process for performing performed by a contact center, in accordance with one or more examples of the present disclosure.

FIG. 6 is a flow diagram illustrating a process 600 of generating and transmitting real-time interaction data at a representative client device. Aspects of the process 600 may be implemented by the representative client device 104, the representative client device(s) 212, and/or other aspects described herein. However, these specific devices are not limited to performing the process 600.

At an operation 602, the process 600 includes receiving a login via a desktop application. As detailed herein, a contact center computing architecture can host a desktop application, and an instance of the desktop application can run on each of a plurality of devices operating in the contact center. Without limitation, the operation 602 can include a representative user logging in on the representative client device 104. In other examples, the devices can include the representative client device(s) 212, the administrator client device(s) 214 and/or other devices.

At an operation 604, the process 600 includes facilitating an interactive communication session at a representative user interface. For example, and as detailed herein, the representative client device 104 can be a thick client device that accesses a contact application, e.g., as a containerized application, that facilitates interaction of a representative of a business or other organization with a customer or other contact. For example, the contact application 110 can facilitate the interactive communication session. The interactive communication session can be a voice session, a chat session, an e-mail session, a text session, social media session, or the like.

At an operation 606, the process 600 includes generating, in real time and based on the interactive communication session, interaction data. For example, the interaction data generation component 112 shown in FIG. 1 can generate data during a session and transmit that data, in real-time, from the representative client device 104. As detailed herein, the interaction data can include video, audio, transcripts, logs, and/or other recordings and/or descriptions of the interactive communication session. In some examples, the desktop application 106 can expose an API for purposes of generating the data. Moreover, the operation 606 can include processing the communication session data, e.g., to format the data. Without limitation, the operation 606 can include performing speech-to-text processing.

At an operation 608, the process 600 includes transmitting the interaction data to a contact center server. For instance, the data can be sent in real-time to the contact center server 102. In examples, the contact center server 102 is configured to receive interaction data from a plurality of different representative client devices. The interaction data is sent in real-time or near real-time from each of the client devices.

At an operation 610, the process 600 includes receiving, in real time and from the contact center server, representative data. As detailed herein, a novel contact center architecture allows for real-time communication between individual client devices, e.g., the representative client device 104, and contact center servers, e.g., the contact center server 102. For instance, the contact center servers can include the representative model(s) 126 that can process the interaction data in real-time to provide the representative with cues for interacting via the in-progress communication session, for receiving new contacts, for receiving metrics associated with the representative, and/or the like.

The foregoing process 600 provides an example process by which data can be generated, transmitted, and processed in real-time in a contact center environment to provide improved functioning in the environment. As detailed herein, the real-time processing can provide improvements in asset allocation, resource management, or the like.

Figure 7:
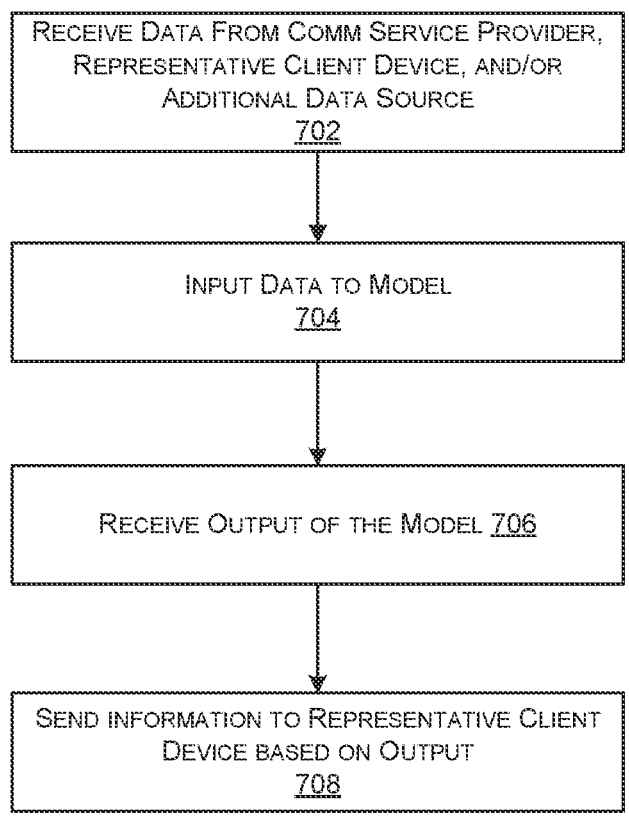
FIG. 7 is a flow diagram illustrating an example process for generating messages in a contact center, in accordance with one or more examples of the present disclosure.

FIG. 7 is a flow diagram illustrating an example process 700 of allocating resources and assigning tasks in a contact center environment. As discussed below, the techniques and operations of process 700 may be performed by various systems and components within the contact center computing environments 100, 200 and 300, such as the contact center server 102, the workflow system 402, and/or other software components of the contact center described herein.

At an operation 702, the process 700 includes receiving data from a communications service provider, a representative client device, and/or and additional data source. In examples detailed herein, a contact center may facilitate interaction of a customer with a representative associated with a business or other organization. The contact center architecture may utilize a number of different applications for facilitating such interactions. In at least some examples, the contact center can leverage third-party communication service providers to interface with customers in different ways. Such interactions may be recorded and/or otherwise used to generate data, including data about the customer, about the interaction, about a product or service for which the customer is reaching out to the contact center, or the like. In at least one example, the operation 702 can be carried out by the data feed component 304 of the workflow system 402. Additional sources of data may include the internal data sources 412 and/or the external data sources 414.

At an operation 704, the process 700 can include inputting the data to a model. For example, a model, such as a heuristic model and/or a machine learned model may process the data received at the operation 702. For example, the workforce management system 122, the quality component 124, the representative model(s) 126, the queue façade 316, the forecasting model 406, and/or the scheduling component 408 can include one or more models that receive data from the representative client device(s) 212, the administration client device(s) 214, the internal data sources 412, the external data sources 414, and or other data. In at least one example, the model may include a machine learning model that is trained on previous data and attributes identified from that data. In some examples, the model can determine a probability associated with determined data.

At an operation 706, the process 700 includes receiving an output of the model. In examples in which the model is associated with the workflow system 402, the output may be schedules generated by the scheduling component 408 and/or the work item(s) 410. In other examples, the output can be metrics associated with a representative, e.g., passed to the representative in real-time or near real-time, a next contact for the representative, in-session instructions or prompts for responding to a contact.

At an operation 708, the process 700 includes sending information to a representative client device based on the output. For example, and as described herein, the representative client device 104 can receive the real-time data 108, e.g., during an interactive communication session. The real-time data can include prompts for continuing the session. Also in examples, the information can include real-time metrics data, information about a next contact, or other information.

In accordance with the foregoing, aspects of this disclosure describe data generation and dissemination in a contact center environment. Aspects of the environment include functionality for providing users of the system with up-to-date information, e.g., in real-time. For instance, representatives using a contact center environment to respond to customer queries may benefit from the processes described herein by receiving important information during communication sessions. Using the thick-client client devices may promote more robust data generation and transmission at the representative device and may facilitate display of timely information at the representative client device.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

As used herein, the term "based on" can be used synonymously with "based, at least in part, on" and "based at least partly on."

As used herein, the terms "comprises/comprising/comprised" and "includes/including/included," and their equivalents, can be used interchangeably. An apparatus, system, or method that "comprises A, B, and C" includes A, B, and C, but also can include other components (e.g., D) as well. That is, the apparatus, system, or method is not limited to components A, B, and C.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

The invention claimed is:

1. A contact center server, comprising:
   one or more processors; and
   one or more non-transitory computer-readable media storing computer-executable instructions that, when executed, cause the one or more processors to perform operations comprising:
   hosting, at the contact center server, a desktop application and a plurality of images associated with containerized applications for interacting with customers;
   receiving, from a first thick client device running the desktop application, a request for a container image associated with a first containerized application of the containerized applications;
   transmitting, to the first thick client device, the container image associated with a first containerized application;
   receiving, from the first thick client device running the first containerized application within the desktop application, first interaction data associated with a first current interactive communication session of the first thick client device with a first customer;
   providing the first interaction data to a trained machine-learned model; and
   outputting, to the first thick client device, data based at least in part on an output of the trained machine-learned model.

2. The contact center server of claim 1, the operations further comprising:
   receiving one or more requests, from one or more service providers, to initiate additional interactive communication sessions; and
   providing information associated with the one or more requests as input to the trained machine-learned model.

3. The contact center server of claim 2, wherein outputting the data comprises outputting information about a next interactive communication session of the additional interactive communication sessions for the first thick client device.

4. The contact center server of claim 1, wherein the outputting the data comprises outputting information about a deferred work item received from an internal service provider over a secure private network.

5. The contact center server of claim 4, wherein the deferred work item comprises a task other than an interactive communication session with a customer.

6. The contact center server of claim 1, the operations further comprising:
   determining a first availability status of the first thick client device based at least in part on the first interaction data.

7. The contact center server of claim 6, the operations further comprising:
   determining, based at least in part on the first availability status, a next interactive communication session for at least one of the first thick client device, or an additional thick client device.

8. The contact center server of claim 1, wherein:
   the trained machine-learned model is trained on one or more process flows and/or one or more tasks associated with the contact center server; and
   the output of the trained machine-learned model comprises allocation data for allocating resources.

9. The contact center server of claim 8, wherein:
   the allocation data comprises first allocation data for allocating a first subset of workers to one or more of the first thick client device or additional thick client devices for performing customer interactive communication sessions, and
   the allocation data comprises second allocation data for allocating a second subset of workers to tasks other than performing customer interactive communication sessions.

10. The contact center server of claim 1, wherein:
    the first interaction data comprises at least one of video data associated with the first current interactive communication session, audio data associated with the first current interactive communication session, text data associated with the first current interactive communication session, or image data associated with the first current interactive communication session.

11. The contact center server of claim 1, the operations further comprising:
    receiving identification information associated with a user of the first thick client device;
    receiving additional interaction data generated from additional interactive communication sessions associated with the user; and
    providing the additional interaction data into the trained machine-learned model,
    wherein the output of the trained machine-learned model is a qualitative metric for the user.

12. The contact center server of claim 11, the operations further comprising:
    training the trained machine-learned model using interaction data generated from previous interactive communication sessions associated with additional users.

13. The contact center server of claim 11, the operations further comprising:
    determining that the qualitative metric for the user is equal to or greater than a target metric; and
    generating training materials based at least in part on the first current interactive communication session or the additional interactive communication sessions.

14. A computing system comprising:
one or more processors; and
memory storing processor-executable instructions that, when executed by the one or more processors, cause the one or more processors to perform operations comprising:
- receiving a login via a desktop application running on a client computing device;
- based at least in part on receiving the login, requesting a container image from a computer server;
- receiving the container image from the computer server;
- executing a containerized process on the client computing device based at least in part on the container image, the containerized process being executed within the desktop application;
- performing, via the containerized process, an interactive communication session;
- generating interaction data associated with the interactive communication session; and
- sending, in-real time and to the computer server, the interaction data.

15. The computing system of claim 14, the operations further comprising receiving at least one of:
- real-time qualitative information associated with the interactive communication session, the real-time qualitative information being based at least in part on the interaction data; or
- real-time interaction information associated with the interactive communication session, the real-time interaction information comprising an instruction associated with the interactive communication session; or
- an instruction to perform a second interactive communication session.

16. The computing system of claim 14, wherein the interaction data comprises at least one of video data associated with the interactive communication session, audio data associated with the interactive communication session, text data associated with the interactive communication session, or image data associated with the interactive communication session.

17. The computing system of claim 14, wherein the generating the interaction data comprises:
- collecting first data from the desktop application; and
- collecting second data via an application programming interface of an operating system of the client computing device.

18. A method comprising:
- receiving, at a user interface of a computing device, a login via a desktop application;
- based at least in part on receiving the login, requesting a container image from a computer server;
- receiving the container image from the computer server;
- executing a containerized process on the computing device based at least in part on the container image, the containerized process being executed within the desktop application;
- performing, via the containerized process, an interactive communication session;
- generating interaction data associated with the interactive communication session; and
- sending, in-real time and to the computer server, the interaction data.

19. The method of claim 18, further comprising:
receiving at least one of:
- real-time qualitative information associated with the interactive communication session, the real-time qualitative information being based at least in part on the interaction data, or
- real-time interaction information associated with the interactive communication session, the real-time interaction information comprising an instruction associated with the interactive communication session, or
- an instruction to perform a second interactive communication session; and
displaying, via a second user interface on the computing device, the at least one of the real-time quantitative information, the real-time interaction information, or the instruction to perform the second interactive communication session simultaneously with performing the interactive communication session.

20. The method of claim 18, wherein:
- the interaction data comprises at least one of video data associated with the interactive communication session, audio data associated with the interactive communication session, text data associated with the interactive communication session, or image data associated with the interactive communication session; and
- the generating the interaction data comprises at least one of collecting first data from the desktop application or collecting second data via an application programming interface of an operating system of the client computing device.

* * * * *